United States Patent
Hillhouse

(10) Patent No.: US 7,512,807 B2
(45) Date of Patent: *Mar. 31, 2009

(54) METHOD AND APPARATUS FOR BIOMETRIC VERIFICATION WITH DATA PACKET TRANSMISSION PRIORITIZATION

(75) Inventor: Robert D. Hillhouse, Ottawa (CA)

(73) Assignee: Activcard Ireland, Limited, Dublin (IE)

(*) Notice: Subject to any disclaimer, the term of this patent is extended or adjusted under 35 U.S.C. 154(b) by 573 days.

This patent is subject to a terminal disclaimer.

(21) Appl. No.: 10/372,093

(22) Filed: Feb. 25, 2003

(65) Prior Publication Data

US 2004/0168091 A1    Aug. 26, 2004

(51) Int. Cl.
*H04L 9/32* (2006.01)
*G06F 7/04* (2006.01)

(52) U.S. Cl. .......................................... 713/186; 726/7

(58) Field of Classification Search ................. 713/186; 726/7
See application file for complete search history.

(56) References Cited

U.S. PATENT DOCUMENTS

| | | | |
|---|---|---|---|
| 4,790,564 A | 12/1988 | Larcher | |
| 5,513,272 A | 4/1996 | Bogosian, Jr. | |
| 5,572,597 A | 11/1996 | Chang et al. | |
| 5,648,648 A | 7/1997 | Chou et al. | |
| 5,876,926 A * | 3/1999 | Beecham ........................ | 435/5 |
| 5,920,640 A | 7/1999 | Salatino et al. | |
| 6,016,476 A | 1/2000 | Maes et al. | |
| 6,137,909 A | 10/2000 | Greinder et al. ............. | 382/190 |
| 6,181,807 B1 * | 1/2001 | Setlak et al. ................. | 382/124 |
| 6,182,221 B1 * | 1/2001 | Hsu et al. ..................... | 713/186 |
| 6,185,682 B1 | 2/2001 | Tang | |
| 6,219,439 B1 | 4/2001 | Burger | |
| 6,241,288 B1 | 6/2001 | Bergenek et al. | |
| 6,247,006 B1 | 6/2001 | Tanabe et al. ................. | 706/47 |
| 6,282,302 B1 | 8/2001 | Hara | |
| 6,311,272 B1 * | 10/2001 | Gressel ........................ | 713/186 |
| 6,325,285 B1 | 12/2001 | Baratelli | |
| 6,330,347 B1 | 12/2001 | Vajna | |
| 6,393,139 B1 * | 5/2002 | Lin et al. ..................... | 382/124 |
| 6,480,617 B2 | 11/2002 | Kovacs-Vajna | |
| 6,547,130 B1 | 4/2003 | Shen | |
| 6,636,975 B1 * | 10/2003 | Khidekel et al. ............. | 726/10 |

(Continued)

FOREIGN PATENT DOCUMENTS

EP     0 343 580     11/1989

(Continued)

OTHER PUBLICATIONS

Bechelli et al., "Biometrics authentication with smartcard" Technical report—Istituto di Informatica e Telematica (IIT), No. 8, pp. 1-12, Mar. 2002, Italy.

(Continued)

*Primary Examiner*—Emmanuel L Moise
*Assistant Examiner*—Michael Pyzocha
(74) *Attorney, Agent, or Firm*—Perkins Coie LLP

(57) ABSTRACT

An authentication mechanism for use with biometric systems which optimizes data extraction on areas or regions having a high probability of matching a reference biometric template, allows a reduction in both the size and number of data packet transmissions to be made to a biometric matching engine and includes data packet transmission prioritization.

35 Claims, 22 Drawing Sheets

U.S. PATENT DOCUMENTS

| | | | |
|---|---|---|---|
| 6,681,034 B1 * | 1/2004 | Russo | 382/125 |
| 6,719,200 B1 * | 4/2004 | Wiebe | 235/382 |
| 6,735,695 B1 * | 5/2004 | Gopalakrishnan et al. | 713/186 |
| 6,853,988 B1 * | 2/2005 | Dickinson et al. | 705/75 |
| 7,016,532 B2 | 3/2006 | Boncyk et al. | |
| 7,064,652 B2 * | 6/2006 | Junqua et al. | 340/5.84 |
| 7,203,343 B2 * | 4/2007 | Manasse et al. | 382/115 |
| 7,209,886 B2 | 4/2007 | Kimmel | |
| 2001/0048025 A1 | 12/2001 | Shinn | |
| 2002/0023020 A1 | 2/2002 | Kenyon et al. | |
| 2002/0090132 A1 | 7/2002 | Boncyk et al. | |
| 2002/0194003 A1 * | 12/2002 | Mozer | 704/270.1 |
| 2004/0143454 A1 * | 7/2004 | Kimmel | 705/2 |
| 2004/0215615 A1 * | 10/2004 | Larsson et al. | 707/9 |

FOREIGN PATENT DOCUMENTS

| | | |
|---|---|---|
| EP | 1452944 | 9/2004 |
| EP | 1452945 | 9/2004 |
| EP | 1462985 | 9/2004 |
| WO | WO 01/11577 A1 | 2/2001 |
| WO | WO 01/84494 A1 | 11/2001 |
| WO | WO 01/99042 A1 | 12/2001 |

OTHER PUBLICATIONS

Poulton, "Feature set comparison for multi-segment face recognition," *International Symposium on Signal Processing and its Applications, ISSPA, Australia*, Aug. 25-30, 1996, 2, 577-580.

* cited by examiner

US 7,512,807 B2

METHOD AND APPARATUS FOR BIOMETRIC VERIFICATION WITH DATA PACKET TRANSMISSION PRIORITIZATION

FIELD OF THE INVENTION

The present invention relates generally to a data processing method, system and computer program product and more specifically to a method, system and computer program product for improving biometric data extraction and registration.

BACKGROUND OF THE INVENTION

Security tokens compliant with the ISO-7816 international standards utilize a relatively slow serial communications pathway to transfer information between a host computer system and an electromagnetically connected security token. The serial pathway is operated in a half duplex mode where information only travels in one direction at a time. This limited communications ability can create a communications bottleneck for users and applications seeking to gain access to one or more security resources, services or applications contained therein. Additionally, security tokens are further limited by relatively slow processors and available storage memory.

This communications bottleneck is further exacerbated when using biometrics for user identification and authentication due to inefficient data extraction, relatively large data transfer requirements and lack of data packet prioritization. In the relevant art, biometric templates can be quite large with some implementations having templates in excess of 100 kilobytes and the best state of the art implementations having biometric templates closer to 300 bytes.

Even 300 bytes of data is still a considerable amount of information to be transferred when compared to a 6 character personal identification number (PIN) which requires only 48 bits of data (plus header overhead) to be transmitted from the host to the security token for about a 1 per 1,000,000 false acceptance rate.

Furthermore, in order to efficiently process the data packet, the receiving security token must have sufficient memory space available to store the incoming data packet in an APDU buffer located on the security token. If the size of the data packet exceeds the available APDU buffer size, the data will need to be segmented and sent sequentially, increasing both the number of handshakes between the host and the security token and the data transmission overhead (e.g., header information), thus reducing data transmission efficiency. A large biometric data transmission will require multiple data packets to be transmitted from the host to the security token, which considerably slows the overall authentication transaction to the point where a user may become impatient with the access delay. Therefore, it is highly desirable to reduce the number of data packets as much as possible, security permitting.

Another significant limitation in the relevant art is the manner in which data is extracted from the raw biometric sample. Currently, there is no mechanism available to direct the host to focus pre-processing of the raw biometric sample on areas or regions having a high probability of matching a reference template stored inside the security token. Rather, a "shotgun" approach is taken where a great deal of non-relevant information is extracted along with relevant data features, encapsulated in data packets and sent to the security token without any processing priority. The security token may process a significant number of data packets before it receives the information necessary to match the extracted biometric sample to the stored reference template.

A similar situation also exists in the relevant art art where a biometric sample is processed by a local client and sent over a network to authentication server. While processing capabilities and available memory storage are not specific limitations, the large amount of data transmission and subsequent processing required by the authentication server limits the ability to perform multiple simultaneous authentication transactions and unnecessarily ties up communications channels and available bandwidth.

A statistically based method to improve false acceptance and rejection rates in matching a biometric sample is disclosed in U.S. patent application 2001/0048025. However, the statistical approach does not attempt to optimize for extraction of relevant biometric data nor addresses the prioritization of data packets for matching a reference biometric template.

Thus, it would be advantageous to provide a mechanism for use with biometric systems, which reduces the number and size of data packet transmissions and provides data packet transmission prioritization.

SUMMARY OF THE INVENTION

It is an object of the invention to provide a method for reducing the total number and/or size of data packet transmissions for at least some processes of performing biometric authentication.

In accordance with the instant invention, there is provided a method of biometric authentication comprising the steps of:
  a) providing a first biometric information sample;
  b) extracting biometric data from the first biometric information sample, the extracted biometric data relating to features reproducibly extractable from said biometric sample;
  c) grouping the biometric data into at least a first packet comprising a portion of the biometric data substantially less than the whole thereof and comprising data sufficient for identification of the biometric sample as relating to a known individual by a biometric matching engine within predetermined limits and at least a second packet comprising a portion of the biometric data substantially less than the whole thereof; and,
  d) transmitting at least one biometric datum of the at least a first packet to the biometric matching engine as a first packet relating to the first biometric information sample.

In accordance with the instant invention, there is provided a system for biometric data extraction and transmission from a biometric sample received by a local client comprising:
  a sensor for providing a first biometric information sample; and
  a processor for extracting biometric data from the first biometric information sample, the extracted biometric data relating to features reproducibly extractable from said biometric sample, for grouping the biometic data into at least a first packet comprising a portion of the biometric data substantially less than the whole thereof and comprising data sufficient for identification of the biometric sample as relating to a known individual by a biometric matching engine within predetermined limits and at least a second packet comprising a portion of the biometric data substantially less than the whole thereof, and for transmitting at least one of the at least a first packet to the biometric matching engine as a first packet relating to the first biometric information sample.

In accordance with the instant invention, there is provided a storage medium having data stored therein, the data relating to instructions for performing the steps of:

providing a first biometric information sample;

extracting biometric data from the first biometric information sample, the extracted biometric data relating to features reproducibly extractable from said biometric sample;

grouping the biometric data into at least a first packet comprising a portion of the biometric data substantially less than the whole thereof and comprising data sufficient for identification of the biometric sample as relating to a known individual by a biometric matching engine within predetermined limits and at least a second packet comprising a portion of the biometric data substantially less than the whole thereof; and, transmitting at least one of the at least a first packet to the biometric matching engine as a first packet relating to the first biometric information sample.

According to another aspect of the instant invention, provided is a method of biometric authentication from a biometric sample received by a local client comprising the steps of:

a. defining a plurality of regions associated with the biometric sample, b. identifying which of the plurality of regions includes biometric data having a high probability of matching a pre-established reference, c. extracting the biometric data from the identified regions, d. incorporating the extracted biometric data into a plurality of data packets, e. arranging the plurality of data packets in a hierarchy which allows selection of the data packets based on the probability of matching the pre-established reference, and f. transmitting a data packet of the plurality of data packets having a known probability of matching the pre-established reference to a biometric matching engine.

According to yet another aspect of the instant invention, provided is a system for biometric data extraction and transmission from a biometric sample received by a local client comprising at least one biometric processing application operatively installed on the local client, wherein the at least one biometric processing application includes means for:

a. defining a plurality of regions associated with the biometric sample, b. identifying which of the plurality of regions includes biometric data having a high probability of matching a pre-established reference, c. extracting the biometric data from the identified regions, d. incorporating the extracted biometric data into a plurality of data packets, e. arranging the plurality of data packets in a hierarchy which allows selection of the data packets based on the probability of matching the pre-established reference, and f. transmitting a data packet of the plurality of data packets having a known probability of matching the pre-established reference to a biometric matching engine.

In accordance with the instant invention, there is also provided a storage medium having stored therein data relating to executable instructions for:

a. defining a plurality of regions associated with the biometric sample, b. identifying which of the plurality of regions includes biometric data having a high probability of matching a pre-established reference, c. extracting the biometric data from the identified regions, d. incorporating the extracted biometric data into a plurality of data packets, e. arranging the plurality of data packets in a hierarchy which allows selection of the data packets based on the probability of matching the pre-established reference, and f. transmitting a data packet of the plurality of data packets having a known probability of matching the pre-established reference to a biometric matching engine.

The method described above may be performed by a system having a biometric matching engine comprised of a server based application, a security token based application or a combination of a server based application and a security token based application which are used to cooperatively process and match a biometric sample.

The programs and associated data may be recorded on transportable digital recording media such as a CD ROM, floppy disk, data tape, or DVD for installing on a host computer system, server and/or security token.

BRIEF DESCRIPTION OF THE INVENTION

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiments without departing from the scope and spirit of the subject invention as defined in the claims.

DETAILED DESCRIPTION OF THE INVENTION

This present invention provides a mechanism for use with biometric systems, which performs registration of biometric data against template data, thus allowing for a reduction in the size and/or number of data packet transmissions for successfully registering a biometric sample against a template and allows data packet transmission prioritization. The applications are envisioned to be programmed in a high level language such as Java TM, C, C++ or Visual Basic TM or in a lower level language such as Assembly language.

Figure 1:
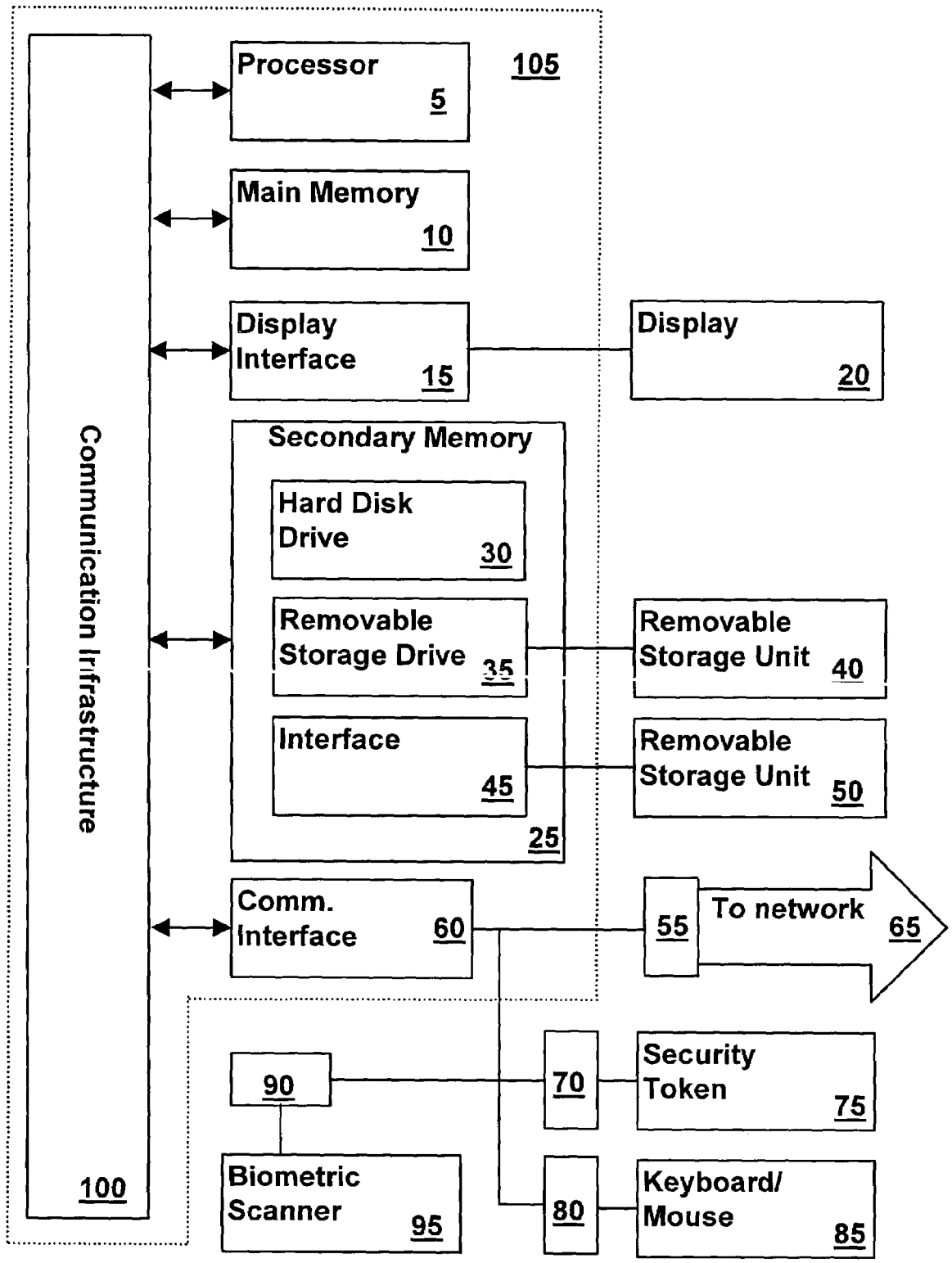
FIG. 1 is a generalized block diagram of a host computer system and an electromagnetically connected security token.

Referring to FIG. 1, a typical host computer system 105 is shown including a processor 5, a main memory 10, a display 20 electromagnetically coupled to a display interface 15, secondary memory subsystem 25 electromagnetically coupled to a hard disk drive 30, a removable storage drive 35 electromagnetically coupled to a removable storage unit 40 and auxiliary removable storage interface 45 electromagnetically coupled to an auxiliary removable storage unit 50.

A communications interface 55 subsystem is coupled to a network interface 60 and a network 65, a security token interface 70 and a security token 75, a user input interface 80 including a mouse and a keyboard 85, a biometric scanner interface 90 and a biometric scanner 95.

The processor 5, main memory 10, display interface 15 secondary memory subsystem 25 and communications interface system 55 are electromagnetically coupled to a communication infrastructure 100. The host computer system includes an operating system, a biometric processing application, other application software and data packet communication applications. The biometric processing application includes an ability to extract relevant data from a biometric sample received from the biometric scanner 95 based on selection criteria.

The selection criteria is optionally supplied from the security token 75, stored locally in the secondary memory 25 or optionally received from a remote server over the network 65. The data packet applications include the ability to transmit and receive messages using a protocol in the form of a TCP/IP protocol and an APDU protocol.

The security token 75 includes an electromagnetic connection compatible with the security token interface 70, the processor, volatile and non-volatile memory electromagnetically coupled to the processor, a runtime operating environment, a security executive application and a biometric matching engine. The non-volatile memory has operatively stored therein a reference biometric template belonging to a token holder for use in verifying the token holder by the security executive application and transferable selection criteria. The transferable selection criteria is in the form of locations of biometric features for use by the biometric processing application for extracting relevant data from a biometric sample received from the biometric scanner.

For purposes of this disclosure and the claims that follow, the term "security token" refers to hardware based security devices such as security tokens, smart cards, cryptography modules, integrated circuit cards, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC) and like devices having an internal processor, memory and a runtime operating system.

As explained heretofore, a performance limitation exists when biometric authentication is performed according to prior art methods. A typical prior art method processes all of the biometric information to correlate same with a template. The correlation is performed to determine a registration result which is comparable with a known threshold value. Unfortunately, such a process requires processing of all the data before a result is known. Therefore, in fingerprint processing the following steps are performed: preprocessing of the image, feature extraction, image alignment, feature extracted value determination within aligned frame of reference, registration of all extracted values against template values to determine registration result, and comparison of registration result threshold value.

For use on a smartcard, this requires that the extracted values fill at most one data packet or multiple data packet transmissions are required. Also, the entire data packet is processed prior to evaluation of the results which suffers due to memory access limitations within the smartcard. Unfortunately, when one data packet is not sufficient, either an individual is difficult to identify and often is falsely rejected or more packets are transmitted to the smartcard resulting in longer delays for everyone.

Figure 2A:
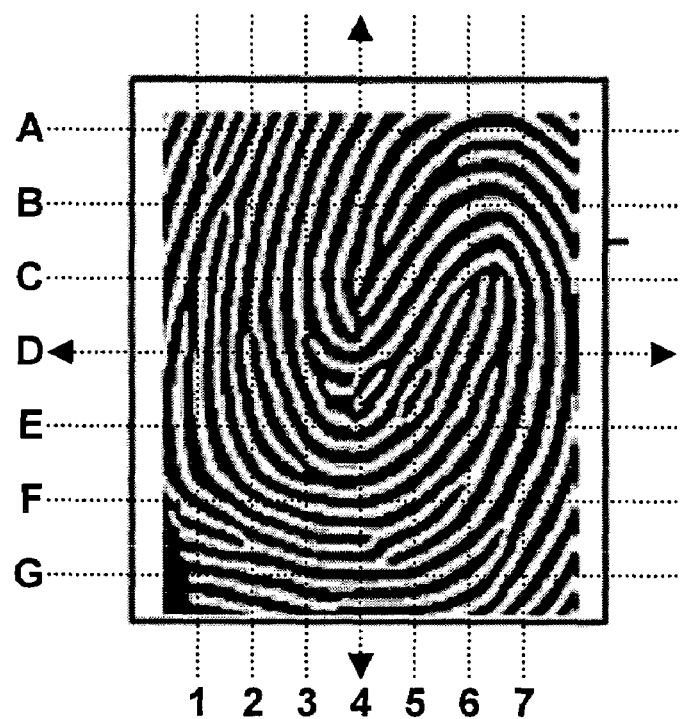
FIG. 2A is a detailed diagram of an exemplary biometric sample having a plurality of regions assigned using a coordinate system.
Figure 2B:
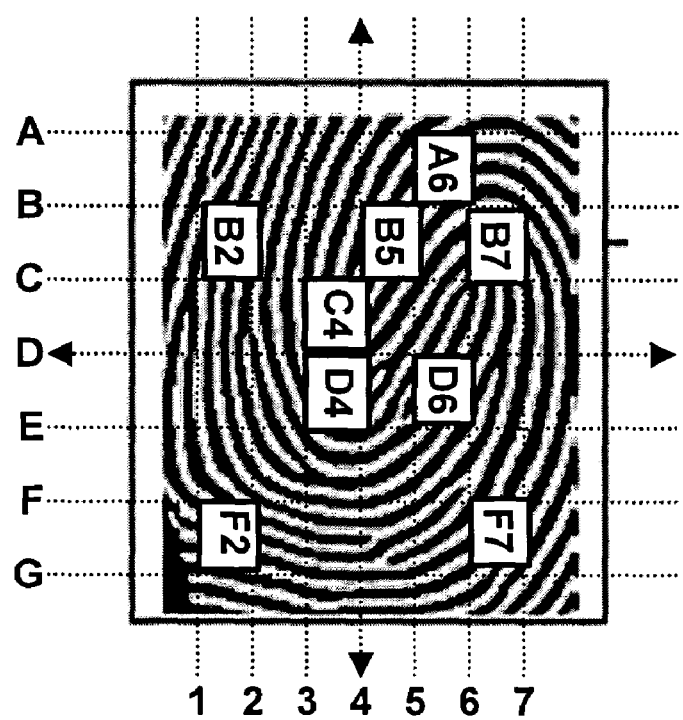
FIG. 2B is a detailed diagram of an example biometric sample having a plurality of specific feature locations identified using the coordinate system.

Referring to FIG. 2A, an exemplary fingerprint biometric sample is shown having an overlay shown in FIG. 2B. The overlay provides locations in a coordinate system for locating biometric features of interest for extraction. A Cartesian coordinate system is shown. Alternatively, other coordinate systems such as polar-rectangular are employed.

Furthermore, the axes shown are arbitrarily centered over the biometric sample. It will be appreciated by one of skill in the art that other arrangements function adequately so long as a consistent coordinate system is used for determination of the locations between the template and the fingerprint biometric sample.

Using such an overlay, it is provided according to an embodiment of the invention that the biometric features of interest are organisable according to a reasonable probability that each feature will lead to an accurate identification of a person providing the fingerprint biometric sample.

Figure 3:
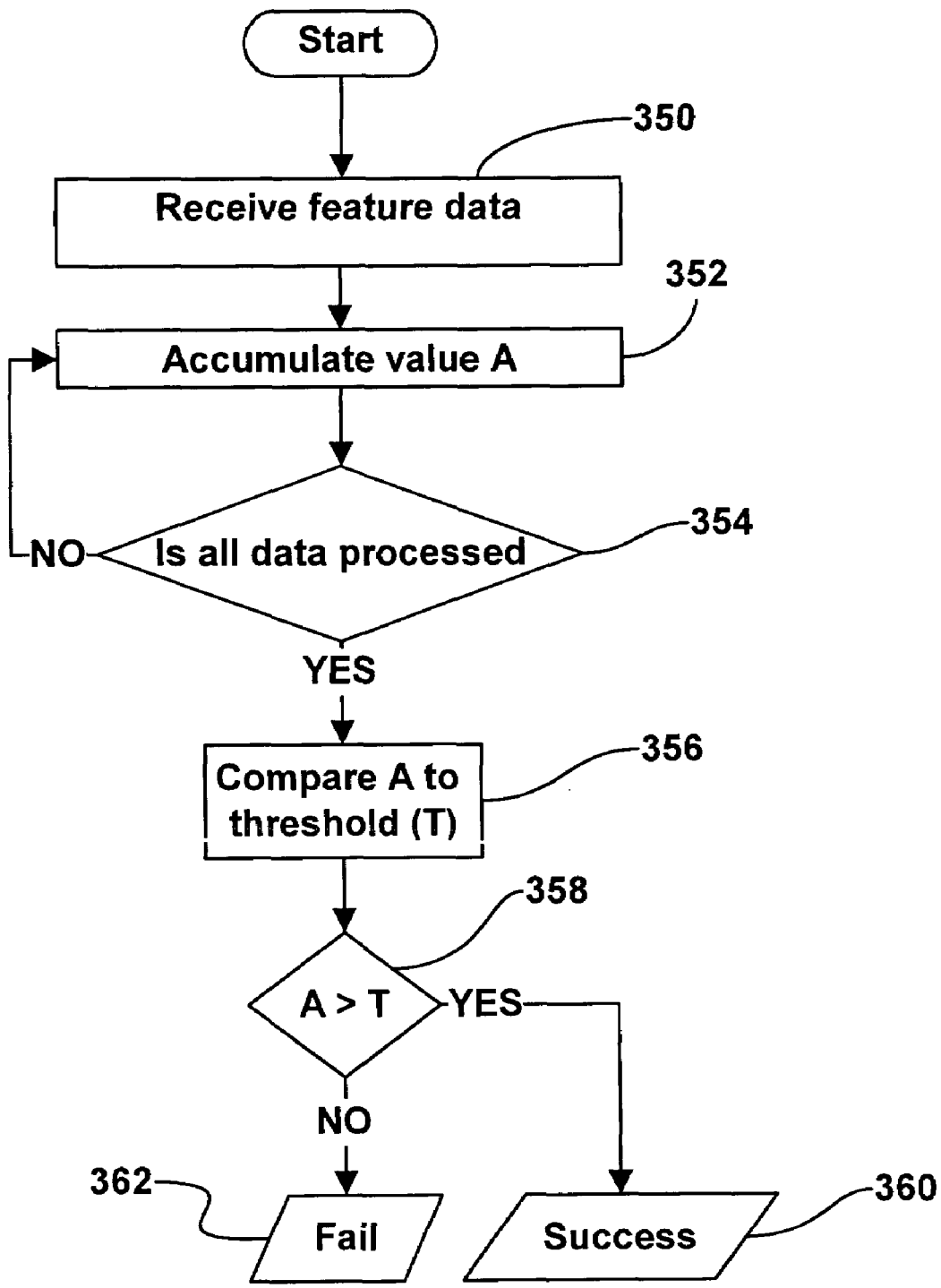
FIG. 3 is a simplified flow diagram of a method of accumulating a value, A, for comparison with a threshold and requiring few memory resources.

Referring to FIG. 3, a simplified flow diagram of an exemplary method according to the invention is shown. Feature data is extracted from a fingerprint biometric sample and is provided for correlation with a template at step 350. A value relating to a known feature within the fingerprint biometric sample is mathematically correlated with a feature template value. The resulting value is accumulated at step 352 according to the following expression:

$$A = \sum_{i=1}^{n} (Diff(V_{si}, V_{ti})/K) \quad (1)$$

where A is the accumulated registration value,
Vs is the value relating to a feature within the biometric sample,
Vt is the value relating to a feature within the biometric template,
K is a constant, and
Diff is a function of Vs and Vt having a result that is always other than negative or always other than positive.

All of the feature data values or a predetermined maximum number are accumulated and, this is verified at step 354. If there remain more feature values, then the process continues accumulating at step 352. Once all data is processed, the value A is compared to a threshold value at step 356 and, in dependence upon the comparison result at step 358, the process is directed to provide a result for the registration of either successful at step 360 or unsuccessful at step 362. A successful registration typically is followed by user identification or authorization. Alternatively, other uses of successful registration such as cryptographic signing are known.

Figure 4A:
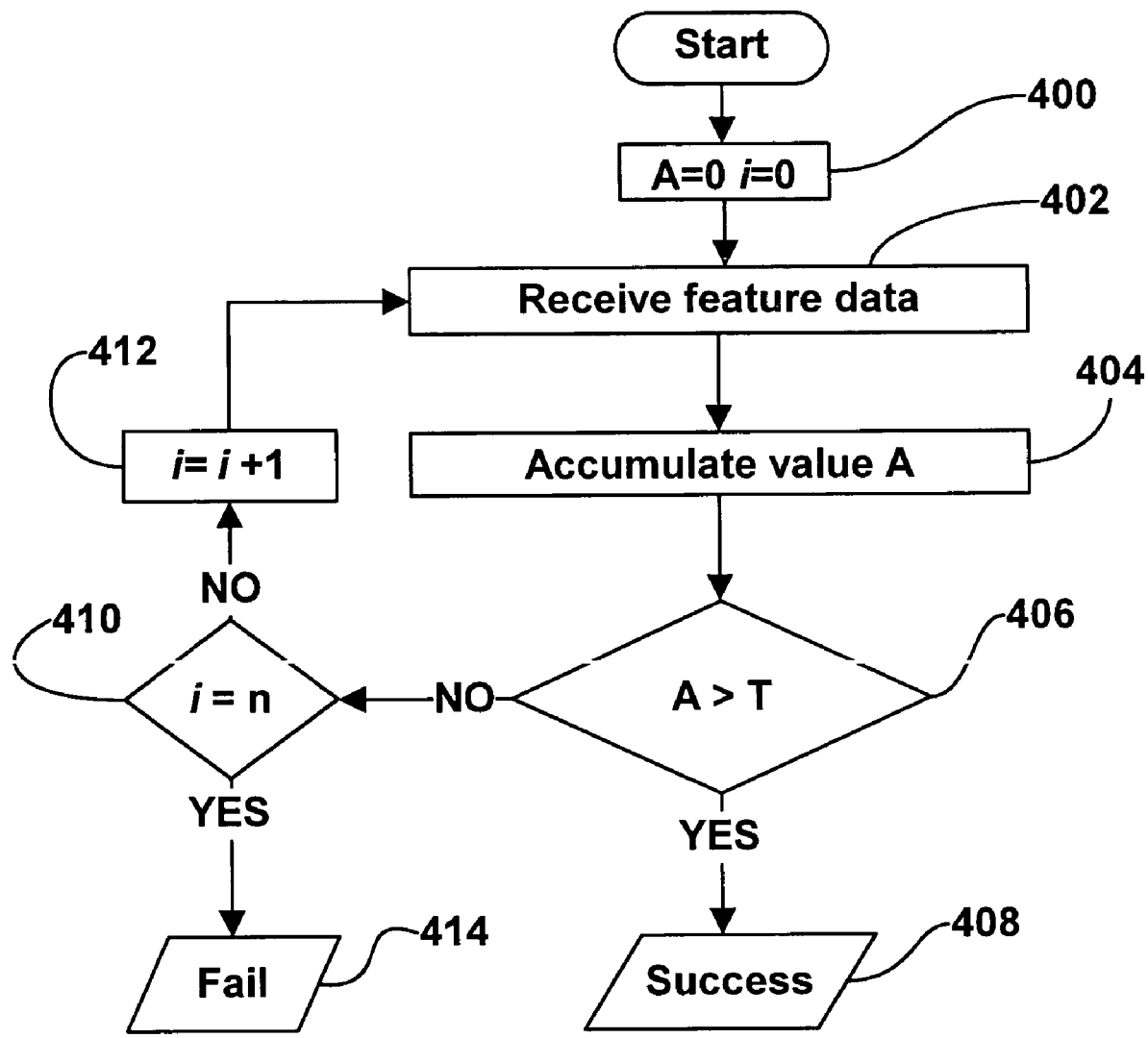
FIG. 4A is a simplified flow diagram of a method of accumulating as data is received a value, A, for comparison with a threshold upon each accumulation step and requiring few memory resources.

Referring to FIG. 4A, a simplified flow diagram of another method according to the invention is shown. Because of the accumulative nature of equation (1), an absence of a feature results in a 0 sum gain to the overall accumulated result, A. This is easily verified by providing a set of values and then providing a same set absent one value. As such, there is no reduction in the overall value of A due to an absent feature. Further, no feature adds to the accumulated value an increment of less than 0.

A careful analysis of the value of A, as i increases, shows that once A has surpassed a value—for example the threshold value—it cannot decrease below said value. As such, termination of the summation upon exceeding the threshold value is sufficient for identification of the provider of the fingerprint biometric sample. Therefore, due to the cumulative effect of the summation, it is possible to use the accumulated value, A, to reduce the amount of processing required to register features against a template by terminating the process once the threshold is achieved. Also, data communication requirements to a processor for performing registration are reduced since subsequent packets need not be transmitted once the threshold value is reached. Of course, this does not affect reliability since a subsequent packet is optionally transmitted when the threshold is other than reached.

Further, the above noted equation requires a very small amount of memory storage for execution. The use of fewer variables requires few memory locations. Further, the accumulative nature of the equation means that other than the values of A and i, there is no memory required between accumulating one feature and another. Once a value is in the buffer, it is compared and accumulated, thereby reducing buffer requirements as well. Therefore, the overall process is implementable in a compact routine without a need for global variables.

At step 400, the accumulated value and a counter are reset. A first feature datum is received at step 402 and, at step 404, is accumulated into the value A. The resulting value A is compared against a threshold value at step 406 and when A is greater then an output signal indicative of success is provided at step 408. Alternatively, when A<=T at step 406, a verification of whether or not feature data remains is performed at step 410. If feature data remains, the remaining feature data is tracked at step 412, for example by incrementing a counter and another feature datum is received at step 402. When no more feature data remains, then an output signal indicative of fail is provided at step 414

Figure 4B:
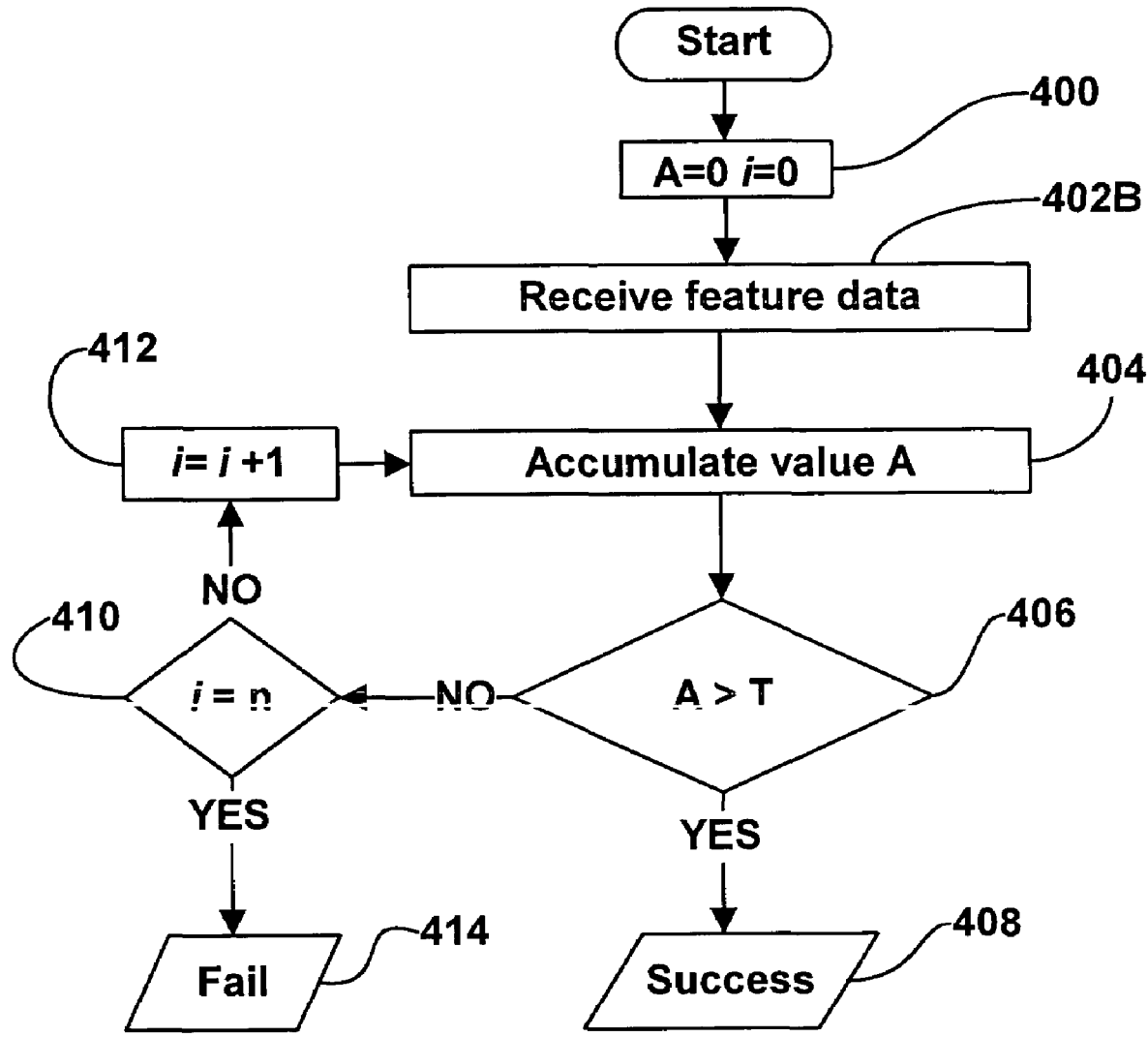
FIG. 4B is a simplified flow diagram of a method of accumulating after data is received a value, A, for comparison with a threshold upon each accumulation step.

Referring to FIG. 4B, another embodiment is shown wherein feature data is completely received prior to processing thereof. At step 400, the accumulated value and a counter are reset. Feature data is received at step 402B and, at step 404, a first datum is accumulated into the value A. The resulting value A is compared against a threshold value at step 406 and when A is greater then an output signal indicative of success is provided at step 408. Alternatively, when A<=T at step 406, a verification of whether or not feature data remains is performed at step 410. If feature data remains, the remaining feature data is tracked at step 412, for example by incrementing a counter and another feature datum is accumulated at step 404. When no more feature data remains, then an output signal indicative of a fail is provided at step 414

Figure 4C:
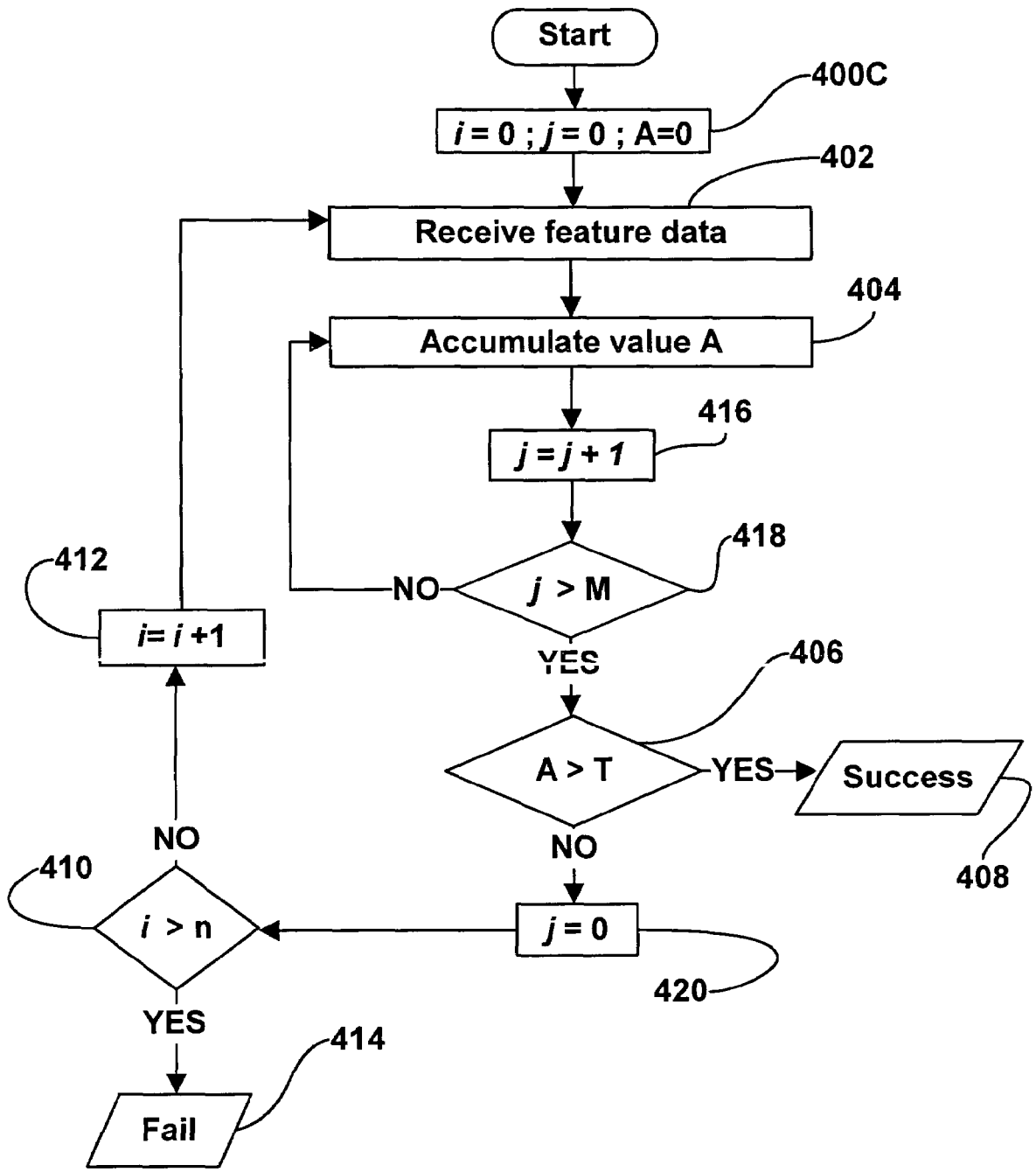
FIG. 4C is a simplified flow diagram of a method of accumulating as data is received a value, A, for comparison with a threshold every M accumulation steps and requiring few memory resources.

Referring to FIG. 4C, another embodiment is shown wherein A is compared to the threshold value every M iterations. At step 400C, the accumulated value, a loop counter, and a counter for monitoring remaining feature data are reset. A first feature datum is received at step 402 and, at step 404, is accumulated into the value A. The loop counter is incremented at step 416 and at step 418, if the loop counter is below the value M the process branches to step 404. If the loop counter value is greater than M, then the resulting value A is compared against a threshold value at step 406 and when A is greater then an output signal indicative of success is provided at step 408. Alternatively, when A<=T at step 406, the loop counter is reset at step 420 and a verification of whether or not feature data remains is performed at step 410. If feature data remains, the remaining feature data is tracked at step 412, for example by incrementing a counter and another feature datum is received at step 402. When no more feature data remains, then an output signal indicative of fail is provided at step 414.

Figure 5A:
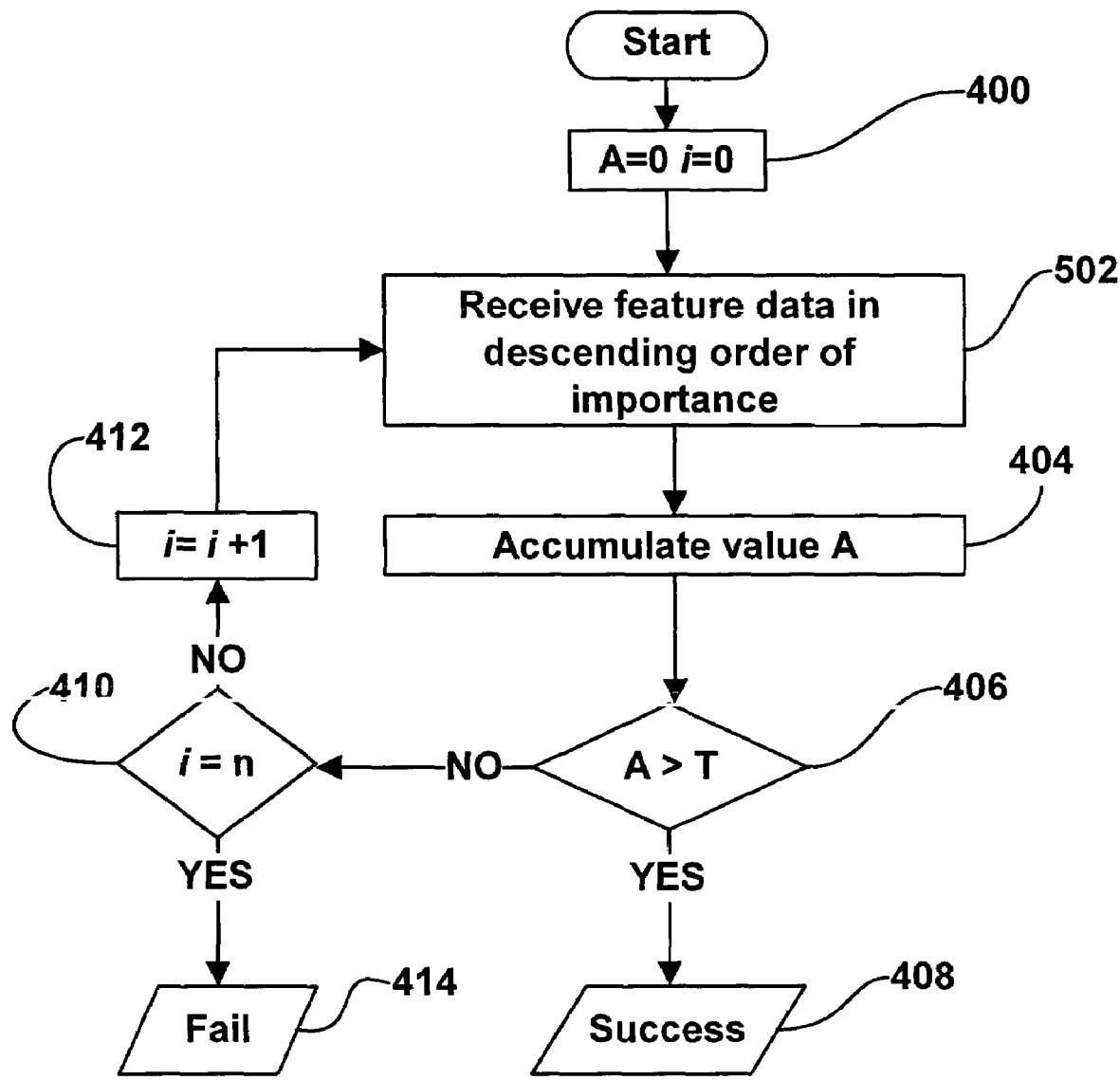
FIG. 5A is a simplified flow diagram of a method of accumulating as data is received in descending order of importance a value, A, for comparison with a threshold upon each accumulation step and requiring few memory resources.
Figure 5B:
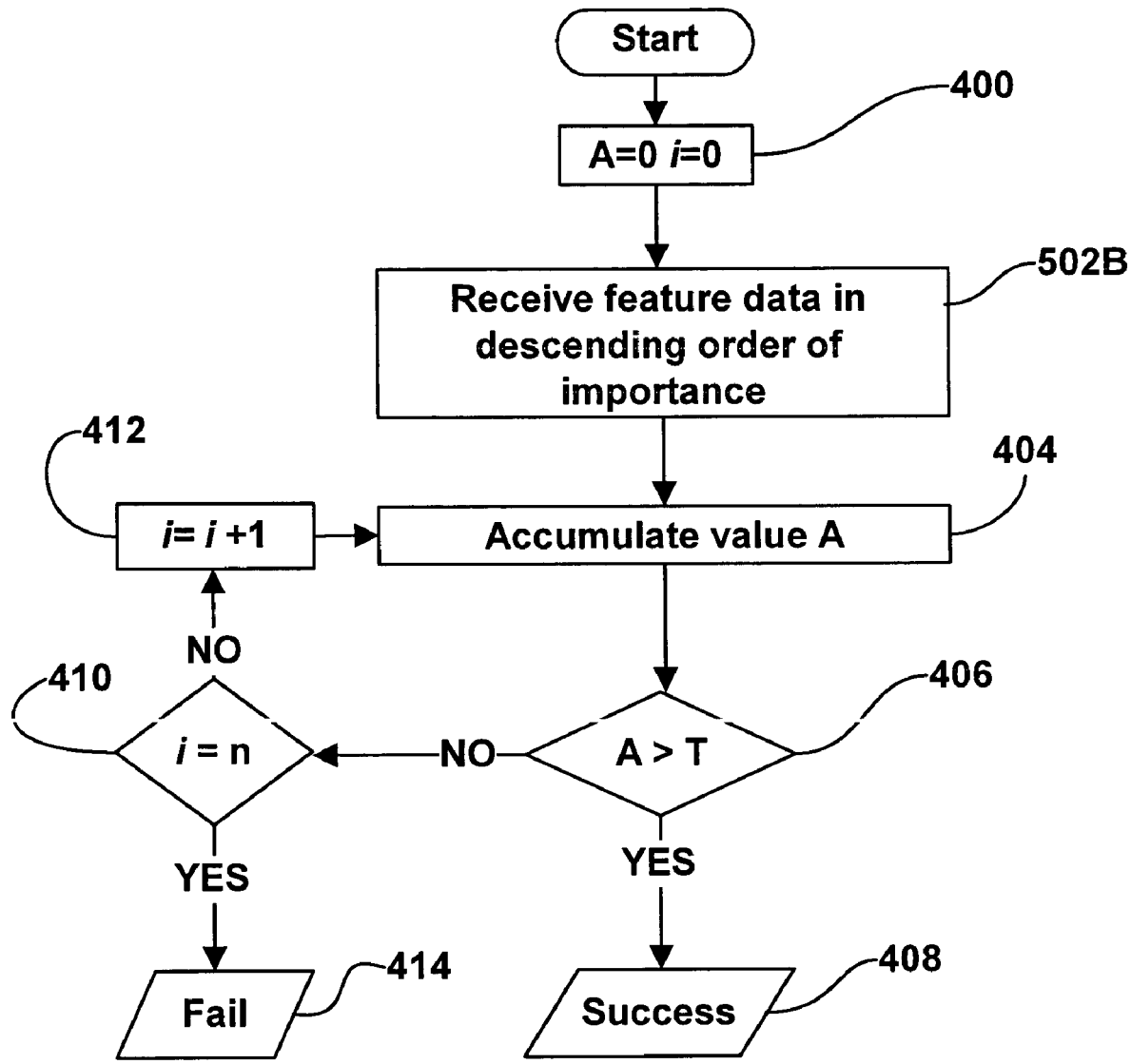
FIG. 5B is a simplified flow diagram of a method of accumulating after data is received in descending order of importance a value, A, for comparison with a threshold upon each accumulation step.

Referring to FIGS. 5A and 5B, methods according to the invention are shown that are at least partially optimized for performance. Here, the features are organized in an order based on a likelihood of those features contributing to A. Thus, the feature having potential to add a greatest amount to the accumulated value, A, is provided first and then the features are supplied in an order of potential to add a greater amount to the accumulated value than subsequent features. Thus, there is supported a method for statistically providing a potential to provide a minimum number of accumulation steps in order to reach a successful registration. This allows for significantly reduced feature data communication for a successful registration and for reduced processing time for same.

Alternatively, instead of ordering all features based on a potential to add a greatest amount to the accumulated value, features are sorted into bins representative of feature quality or feature uniqueness. Those features that are of greater quality are likely to be more significant in the registration process and, as such, they are provided for registration earlier. Of course, some interspacing of different features is also possible though not typically preferable.

Referring to FIG. 5A, at step 400, the accumulated value and a counter are reset. A first feature datum is received at step 502, the feature data are provided in an order from most valuable feature datum to least valuable feature datum. A feature datum is considered more valuable if it is more likely to add a significant amount to A than other data or if the value it is likely to add to A is in excess of a value attributable to other data. At step 404, is accumulated into the value A. The resulting value A is compared against a threshold value at step 406 and when A is greater then an output signal indicative of success is provided at step 408. Alternatively, when A<=T at step 406, a verification of whether or not feature data remains is performed at step 410. If feature data remains, the remaining feature data is tracked at step 412, for example by incrementing a counter and another feature datum is received at step 502. When no more feature data remains, then an output signal indicative of fail is provided at step 414

Referring to FIG. 5B, another embodiment is shown wherein feature data is completely received prior to processing thereof. At step 400, the accumulated value and a counter are reset. Feature data is received at step 502B, the feature data provided in an order from most valuable feature datum to least valuable feature datum. A feature datum is considered more valuable if it is more likely to add a significant amount to A than other data or if the value it is likely to add to A is in excess of a value attributable to other data. At step 404, a first datum is accumulated into the value A. The resulting value A is compared against a threshold value at step 406 and when A is greater then an output signal indicative of success is provided at step 408. Alternatively, when A<=T at step 406, a verification of whether or not feature data remains is performed at step 410. If feature data remains, the remaining feature data is tracked at step 412, for example by incrementing a counter and another feature datum is accumulated at step 404. When no more feature data remains, then an output signal indicative of fail is provided at step 414

Figure 5C:
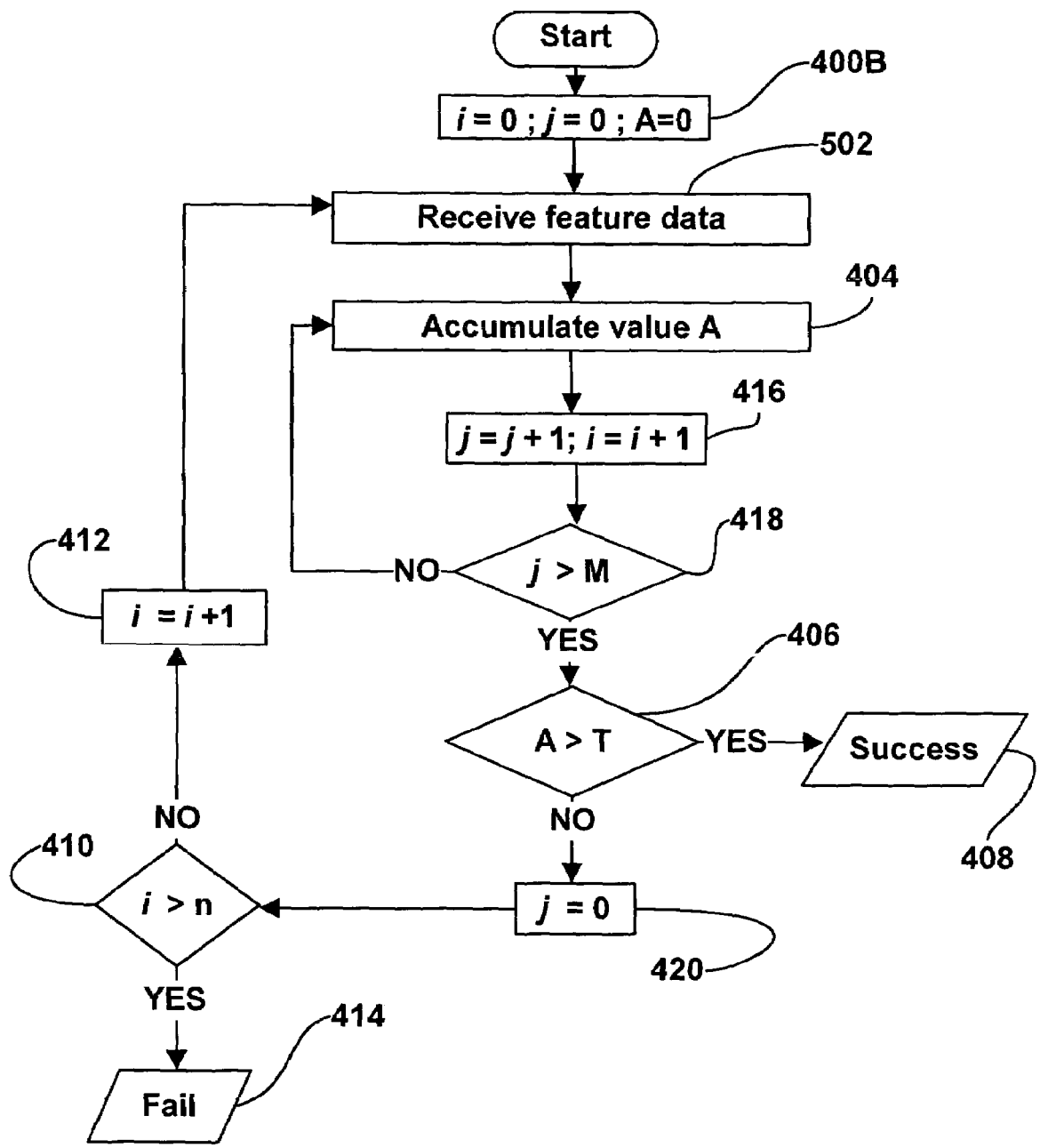
FIG. 5C is a simplified flow diagram of a method of accumulating as data is received in descending order of importance a value, A, for comparison with a threshold every M accumulation steps and requiring few memory resources.

Referring to FIG. 5C, another embodiment is shown wherein A is compared to the threshold value every M iterations. At step 400B, the accumulated value, a loop counter, and a counter for monitoring remaining feature data are reset. A first feature datum is received at step 502, the feature data provided in an order from most valuable feature datum to least valuable feature datum. A feature datum is considered more valuable if it is more likely to add a significant amount to A than other data or if the value it is likely to add to A is in excess of a value attributable to other data. At step 404, the results of processing of the datum is accumulated into the value A. The loop counter is incremented at step 416 and at step 418, if the loop counter is below the value M the process branches to step 404. If the loop counter value is greater than M, then the resulting value A is compared against a threshold value at step 406 and when A is greater than an output signal indicative of success is provided at step 408. Alternatively, when A<=T at step 406, the loop counter is reset at step 420 and a verification of whether or not feature data remains is performed at step 410. If feature data remains, the remaining feature data is tracked at step 412, for example by incrementing a counter, and another feature datum is received at step 502. When no more feature data remains, then an output signal indicative of fail is provided at step 414.

A successful registration typically is followed by user identification or authorization, though other uses of successful registration such as retrieving a cryptographic key for cryptographic signing are known.

For use with different processors, it is a straightforward process of experimentation or analysis to determine a number of iterations, M, between threshold comparisons to statistically optimize performance. Since the accumulated value is updated for each feature, any number of iterations, 1, 2, ... m, between threshold comparisons is supported.

Figure 6A:
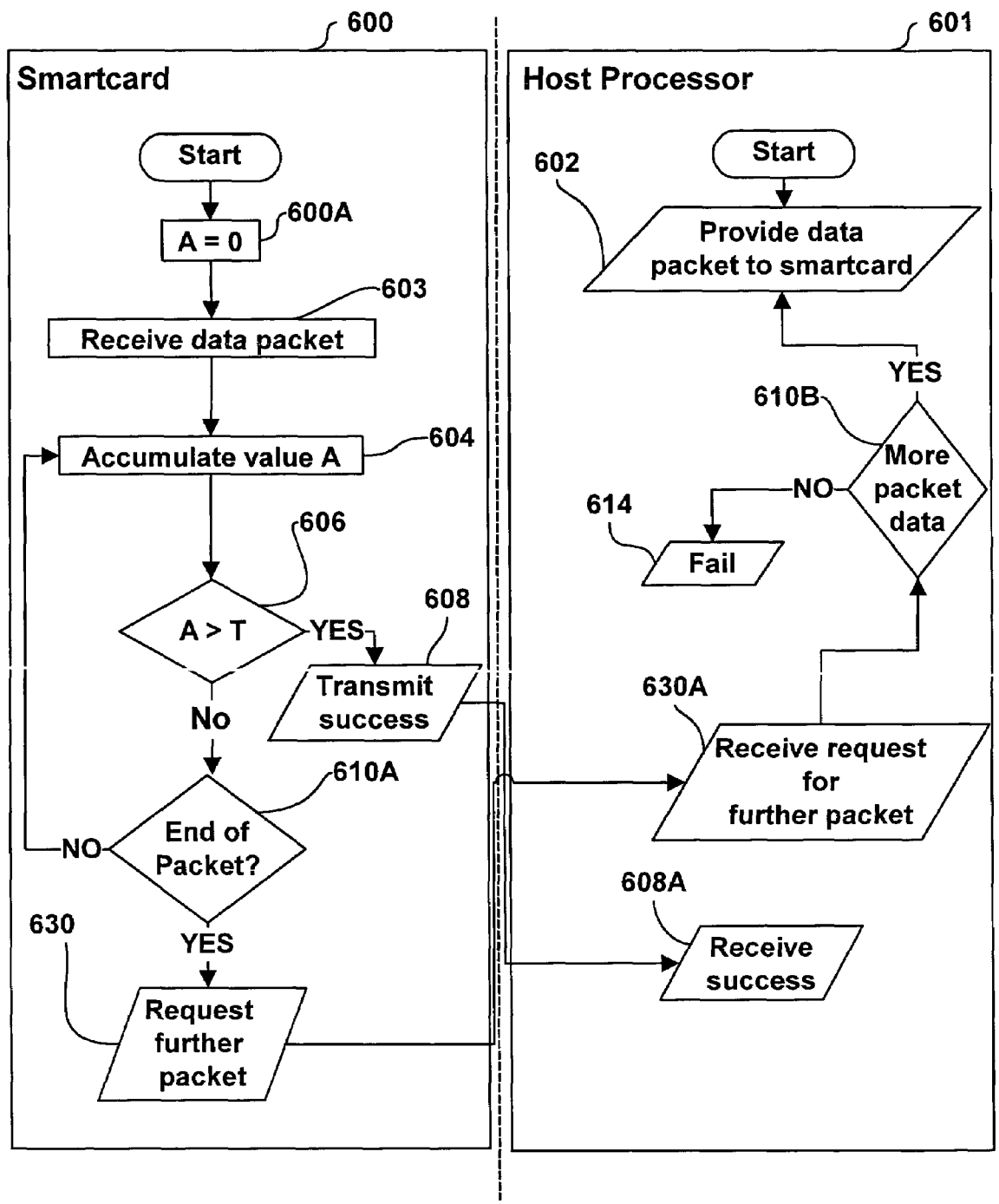
FIG. 6A is a simplified flow diagram of a method of accumulating as data is received on a smartcard, A, for comparison with a threshold upon each accumulation step and requiring few memory resources.

Referring to FIG. 6A, a method according to the invention is shown similar to that shown in FIG. 5A for implementation on a smartcard 600 in execution of Java and in communication with a host processor 601. A data packet of up to 256 bytes is provided to the smartcard 600 including feature data at step 602. The data packet is received within the smartcard 600 at step 603. Prior to step 603, the accumulated value, A, is reset at step 600a. For each feature, the accumulated value is updated at step 604. The updated accumulated value is compared to a threshold at intervals of features of one feature (M=1 as shown) or more (M>1) at step 606. If the threshold is surpassed, then an output signal indicative of success is transmitted from the smart card at step 608 and received by the host processor at step 608A. If the threshold is not surpassed, a verification of remaining features is performed at step 610A. If features remain, the process continues accumulating values relating to other features at step 604. Once the data within the packet is processed, a new packet is requested at step 630. The new packet request is provided to the host processor 601 and is received thereby at step 630A. If no more packet data remains as determined at step 610B, then an output signal indicative of a fail is provided at step 614. If more packet data remains, then another packet is provided to the smartcard at step 602.

Advantageously, because of the accumulative nature of the method, only temporary values are needed during processing of a single packet. Some common implementations of Java require storage of global values in a slow form of memory. Thus, the use of temporary variables is beneficial. Once a new data packet is requested, the accumulated value and the feature index are stored in global variables, the new packet is retrieved, and then the global variables are loaded into temporary variables for use in further processing of the new data packet.

Figure 6B:
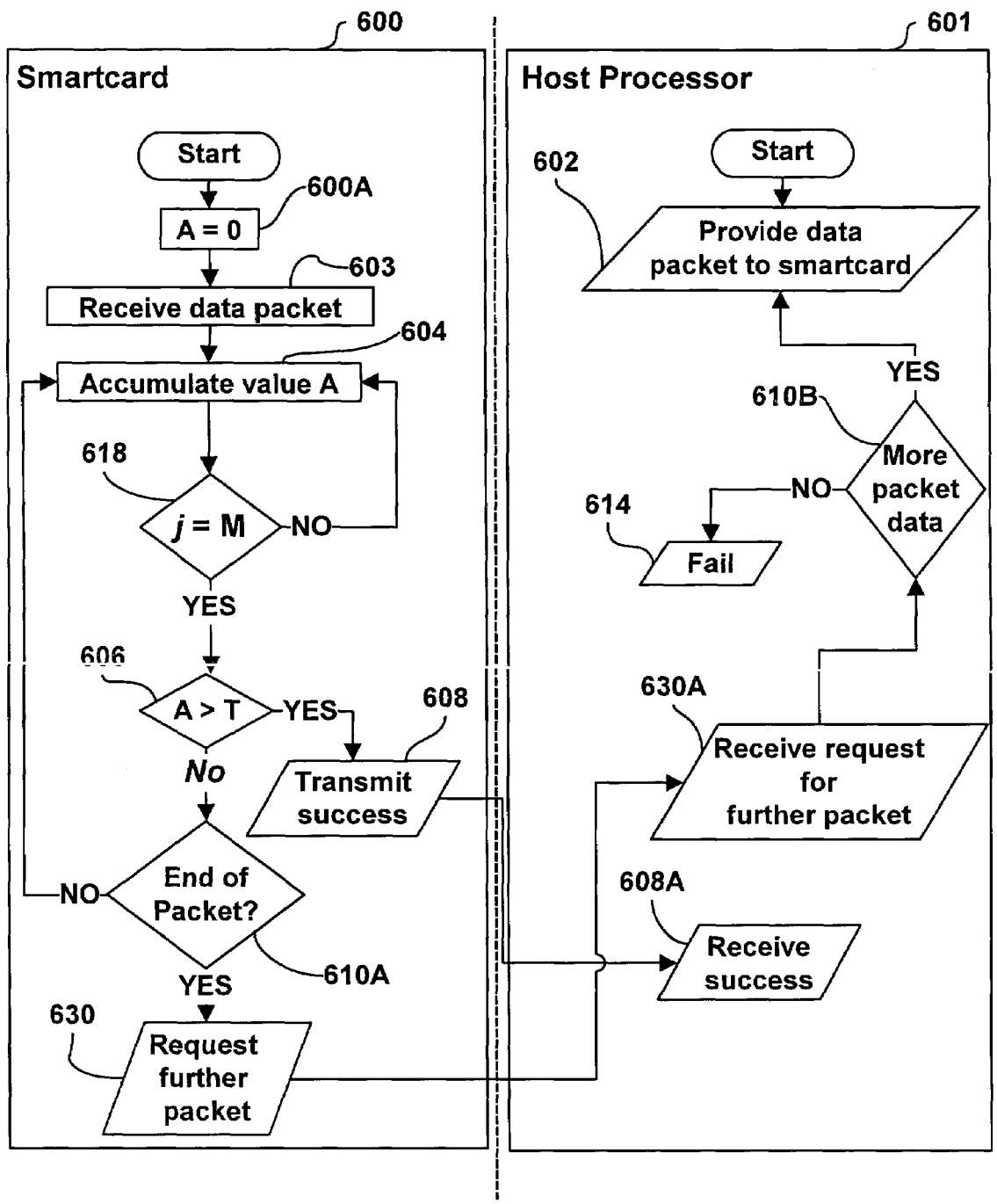
FIG. 6B is a simplified flow diagram of a method of accumulating as data is received on a smartcard, A, for comparison with a threshold every M accumulation steps and requiring few memory resources.

Referring to FIG. 6B, a method according to the invention is shown similar to that shown in FIG. 5B for implementation on a smartcard 600 in execution of Java and in communication with a host processor 601. The step 618 is added to the diagram of FIG. 6A to allow for an inner loop count and compare to allow for M greater than 1. Otherwise, the method operates similar to that described with reference to FIG. 6A. A data packet of up to 256 bytes is provided to the smartcard 600 including feature data at step 602. The data packet is received within the smartcard 600 at step 603. prior to step 603, the accumulated value, A, is reset at step 600a. For each feature, the accumulated value is updated at step 604. At step 618, a loop counter is incremented and compared to a value of M. When the loop counter is less than M, another value is accumulated at step 604. When the loop counter reaches M, the updated accumulated value is compared to a threshold at intervals of features of one feature (M=1 as shown) or more (M>1) at step 606. If the threshold is surpassed, then an output signal indicative of success is transmitted from the smart card at step 608 and received by the host processor at step 608A. If the threshold is not surpassed, a verification of remaining features is performed at step 610A. If features remain, the process continues accumulating values relating to other features at step 604. Once the data within the packet is processed, a new packet is requested at step 630. The new packet request is provided to the host processor 601 and is received thereby at step 630A. If no more packet data remains as determined at step 610B, then an output signal indicative of a fail is provided at step 614. If more packet data remains, then another packet is provided to the smartcard at step 602.

Figure 7:
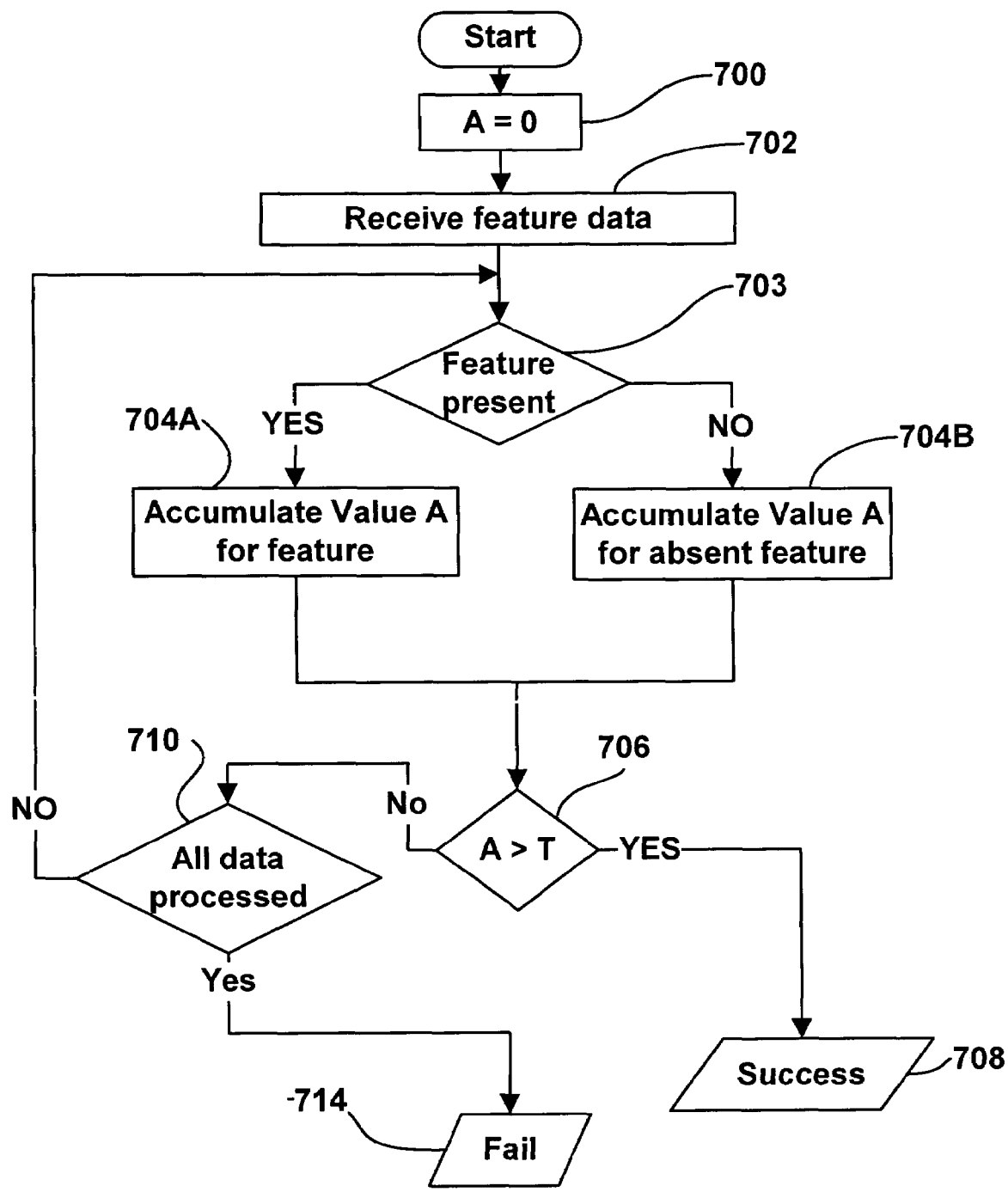
FIG. 7 is a simplified flow diagram of a method of accumulating, A, based on feature data and absence of feature data for comparison with a threshold every M accumulation steps and requiring few memory resources.

Of course, the absence of features is also useful as a registration feature. Thus, the absence of a feature is also potentially used in accordance with embodiments of the invention to identify an individual. A method of using absent features is shown in FIG. 7 and in accordance with the method of FIG. 3. Of course, a method such as those shown in FIGS. 4 and 5 is also useful with absent feature data.

The flow diagram of FIG. 7 shows an accumulation method wherein present features result in a certain accumulation relating to a distance between those features and data within the template. An indication of an absent feature results in an accumulation according to another formula. Thus, the accumulated value is reflective of features and absence of features within the fingerprint biometric sample. At step 700, the accumulated value, A, is reset. Feature data is received at step 702. For each datum, an analysis of whether it relates to a present feature is performed at step 703. When a datum relates to a present feature, the datum is accumulated using a similar method to that described above at step 704A. When the datum relates to an absent feature, the datum is accumulated using a process relating to absent features at step 704B. The accumulated value A is compared to a threshold value T at step 706. If A exceeds T, then an output signal indicative of success is provided at step 708. When A does not exceed T, then the remaining data is determined at step 710. When no data remains, an output signal indicative of fail is provided at step 714. Otherwise the process continues at step 703.

Of course, modifications to the process of FIG. 7 in accordance with the above presented variations are also envisioned.

Figure 8:
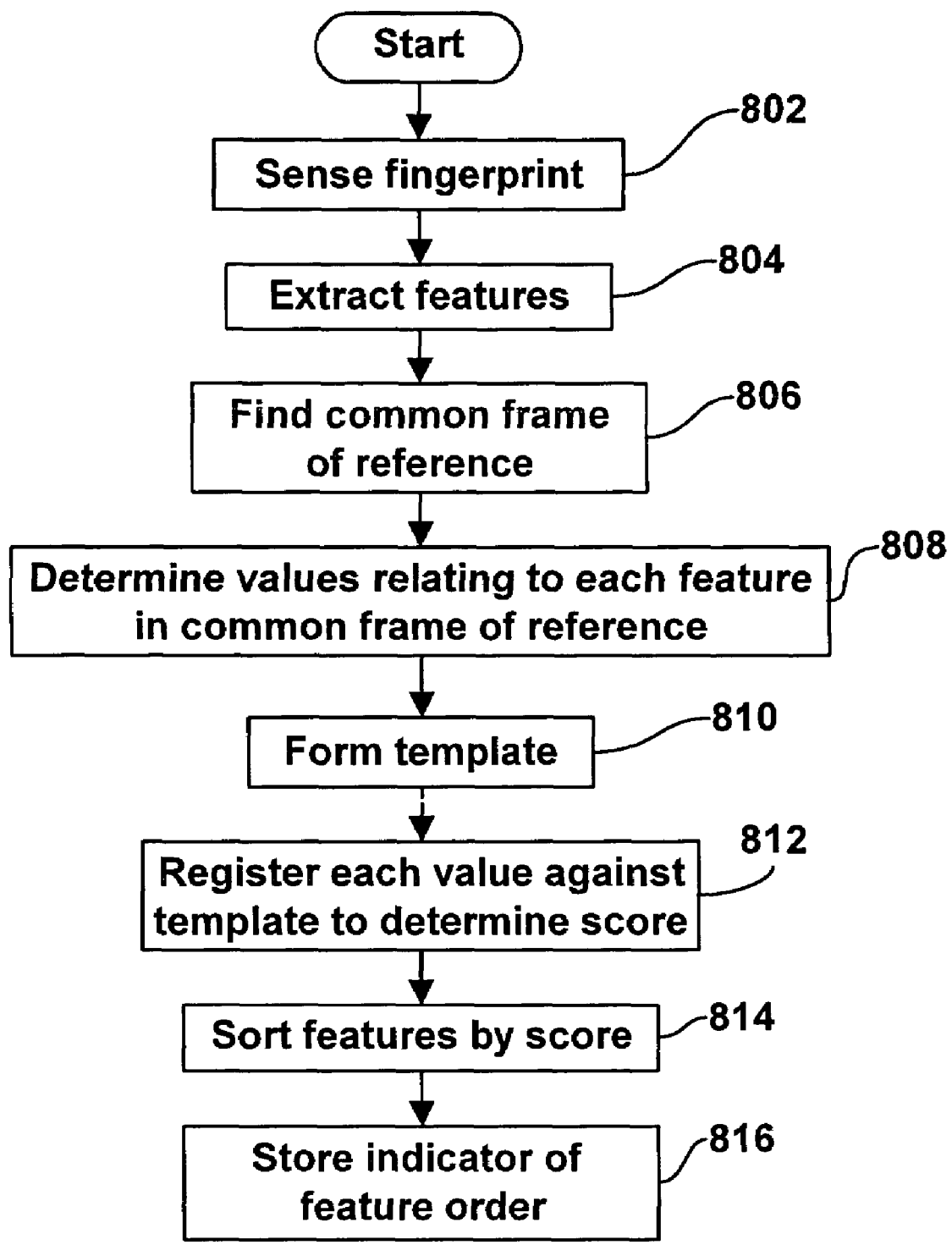
FIG. 8 is a simplified flow diagram of a method of forming a template in accordance with the invention wherein feature data is extracted in a known frame of reference and then features are sorted based on their probabilistic contribution to A.

Referring to FIG. 8, a method of sorting features and storing feature data within a template according to the invention is shown. At step 802, a fingerprint image is sensed. During enrollment, features are extracted from the sensed fingerprint image at step 804. A common frame of reference is determined at step 806 for the fingerprint image in order to provide for repeatable alignment thereof. This allows for comparison of feature data extracted from subsequently sensed fingerprint images with template data in a common frame of reference. For example, a common frame of reference is determined using the fingerprint core. Feature data is then determined based on the extracted features and the common frame of reference at step 808. Typically, the feature data includes some feature identifier and at least a value relating to the feature. Of course, when feature order is known, no feature identifier is needed. Based on the feature data a template is formed at step 810. The feature data are then each registered against the template to determine an individual accumulated value for each at step 812. The features are then sorted based on their accumulated values in descending order at step 814. Finally, an ordering of the features is stored at step 816 for later use in retrieving values relating to features in the order determined through the step of sorting.

Figure 9:
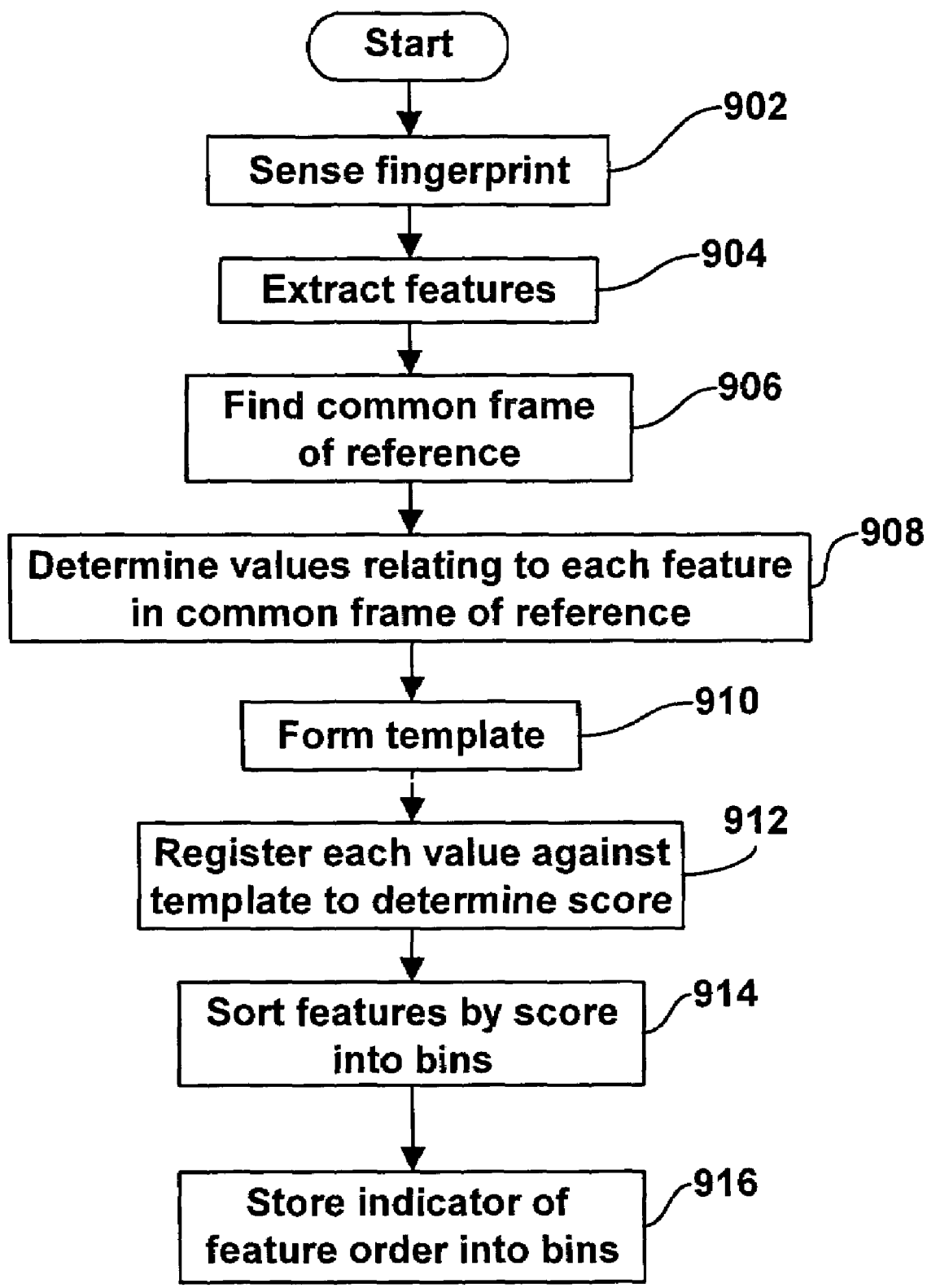
FIG. 9 is a simplified flow diagram of a method of forming a template in accordance with the invention wherein feature data is extracted in a known frame of reference and then features are binned based on their probabilistic contribution to A.

Referring to FIG. 9, a method of sorting features and storing feature data within a template according to the invention is shown. At step 902, a fingerprint image is sensed. During enrollment, features are extracted from the sensed fingerprint image at step 904. A common frame of reference is determined at step 906 for the fingerprint image in order to provide for repeatable alignment thereof. This allows for comparison of feature data extracted from subsequently sensed fingerprint images with template data in a common frame of reference. For example, a common frame of reference is determined using the fingerprint core. Feature data is then determined based on the extracted features and the common frame of reference at step 908. Typically, the feature data includes some feature identifier and at least a value relating to the feature. Of course, when feature order is known, no feature identifier is needed. Based on the feature data a template is formed at step 910. The feature data are then each registered against the template to determine an individual accumulated value for each at step 912. The features are then sorted into bins based on their accumulated values similar accumulated values stored within a same bin at step 914. Finally, an indicator of each feature's bin is stored at step 916 for later use in retrieving values relating to features in an order relating to the binning thereof.

Figure 10A:
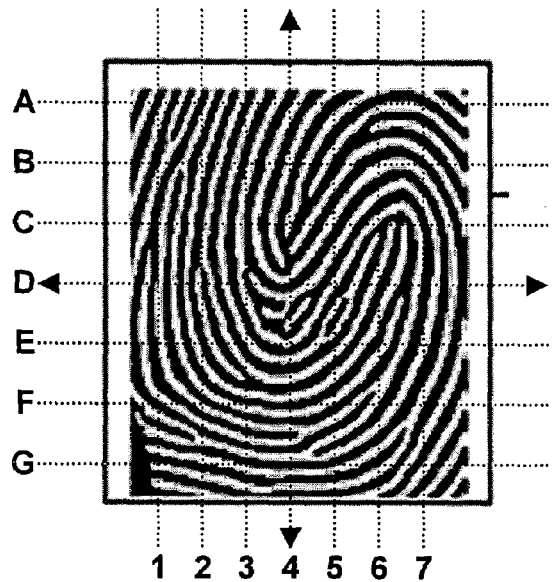
FIG. 10A is a detailed diagram of an example biometric sample.

Referring to FIG. 10A, an exemplary fingerprint biometric sample is shown having a regional overlay. The regional overlay provides regions or areas and a coordinate system for locating biometric features of interest for extraction. A Cartesian coordinate system is shown, however, other coordinate systems such as polar-rectangular may be used as well.

Furthermore, the axes shown are arbitrarily centered over the biometric sample. It will be appreciated by one skill in the art that other arrangements will work as well so long as a consistent coordinate system is used for determination of the regions or areas having the highest probability of matching a reference template.

For fingerprints, it has been determined empirically that a regional overlay size having a grid of approximately 16×16 provides sufficient regional definition without significant deterioration in transaction processing speed. It should be noted that individual regions may be variably sized to accommodate specific features and/or locations to be extracted from a biometric sample.

In one embodiment of the invention, postliminary analyses are performed where a database containing a large number of biometric samples and their associated reference biometric templates are processed using a regional overlay. The regional overlay divides the biometric sample into individually identifiable regions. The density of regions may be varied to better discriminate between adjacent regions having closely clustered biometric features of interest for extraction.

However, a balance is preferably maintained between the number of defined regions and available processing capabilities, since increasing the number of defined regions requires greater processing time, more memory and increases the number of data packets to be sent to the biometric matching engine.

The empirical results are recorded to determine the areas or regions having the highest probability of providing data of significant value in determining a match between the biometric sample and an associated reference biometric template. In this first embodiment of the invention, the determined regional locations or areas are not required to be specific to a particular individual but are determined statistically and/or using data mining techniques based on the large number of observations for a particular biometric sample type. For example, left index finger fingerprints.

In order for this technique to be effective, the database should contain a sufficient number of records to generate statistically significant results.

In a second embodiment of the invention, a heuristic approach is employed where a particular individual's biometric authentication transactions are recorded over time to determine which regions or areas provides the highest contribution to matching. In a third embodiment of the invention, a combination of postliminary and heuristic methods are employed which allows "fine tuning" of the regional selection criteria.

Figure 10B:
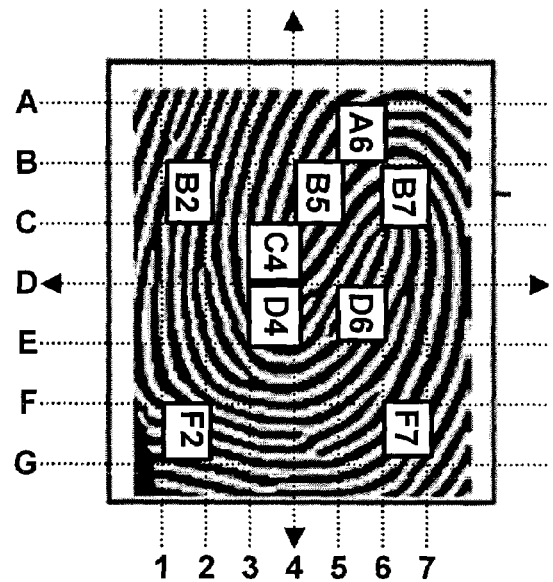
FIG. 10B is a detailed diagram of an example biometric sample having a plurality of specific sampling regions identified using the coordinate system.
Figure 10C:
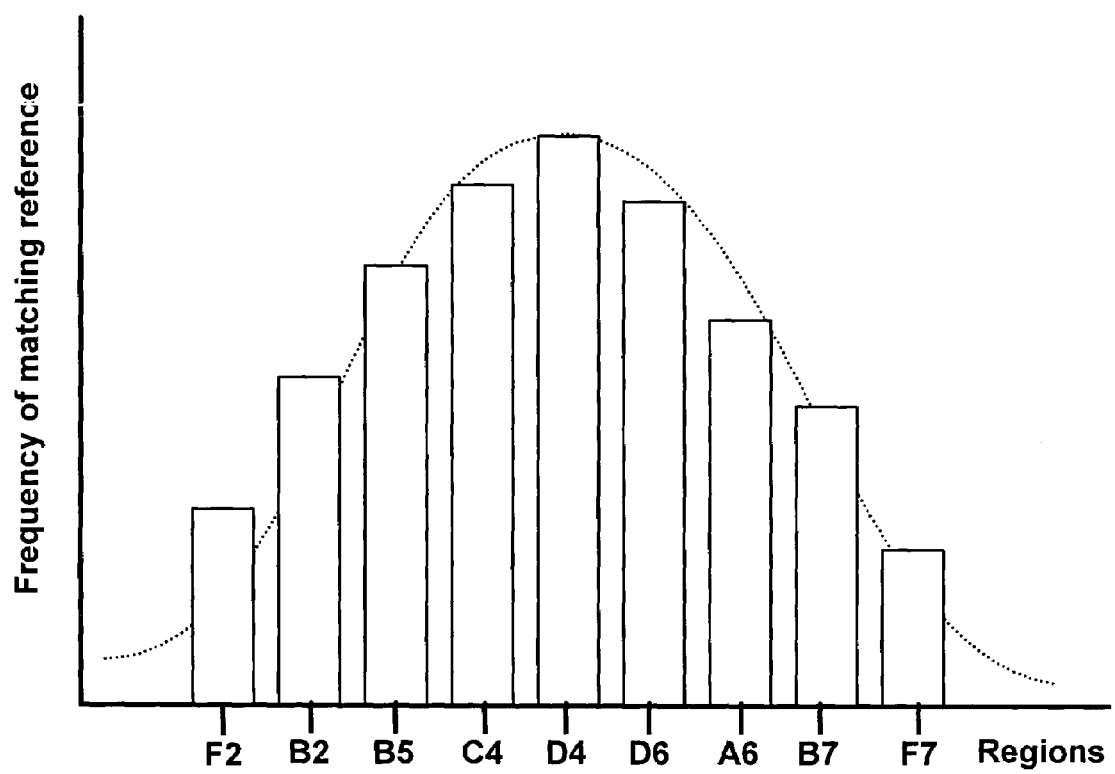
FIG. 10C is a detailed histogram illustrating the probability of matching a reference template based on the assigned regions.

Referring to FIG. 10C, a histogram chart is shown depicting results obtained from identified regions having the highest frequency of matching a biometric reference template. From the chart, it is determined which regions should be sampled and the order in which the extracted results should be sent to the biometric matching engine.

Referring to FIG. 10B, the identified regions having the highest match rates are shown which were interpreted from the results depicted in FIG. 10A. From FIG. 10A, it is apparent that region D4 was found to provide a majority of information for matching a counterpart biometric reference template. Therefore, the data extracted from region D4 is preferably encapsulated and sent first to the biometric matching engine, followed by the data extracted from region C4 and progressing in descending order of priority the data extracted from the remaining identified regions. Areas not providing significant contribution to matching the reference biometric template are optionally excluded from the data transmitted to the biometric matching engine.

Figure 10D:
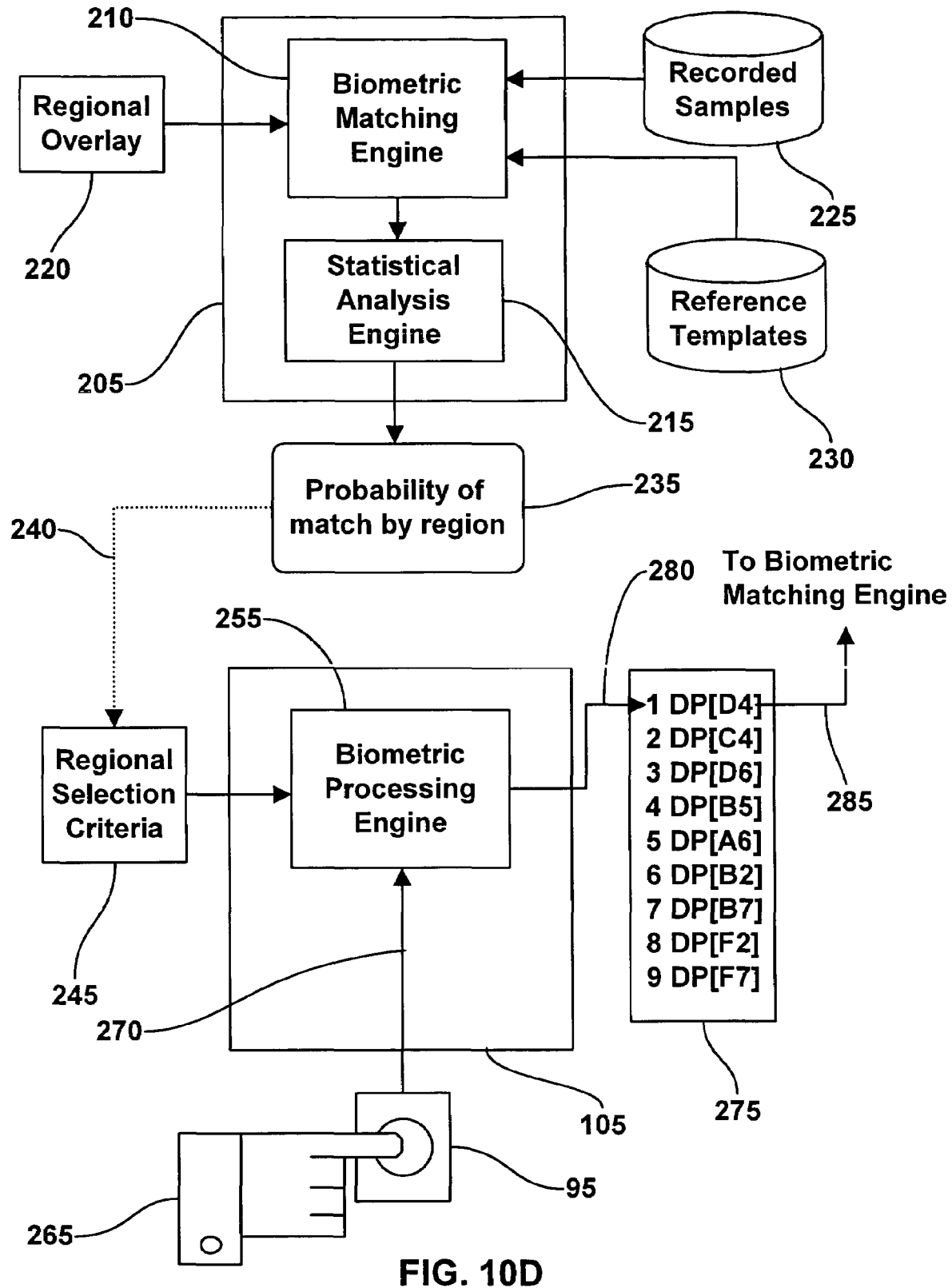
FIG. 10D is a detailed block diagram of one embodiment of the invention where a regional selection criteria is generated, employed to extract biometric information and incorporated into data packets (DP) having a transmission hierarchy.

Referring to FIG. 10D, an overview of the regional selection criteria generation and use is depicted. For this embodiment of the invention, a computer system 205 includes a biometric matching engine 210 receiving inputs from databases storing the recorded biometric samples 225 and the counterpart reference templates 230. The databases should have a sufficient number of records to provide statistically significant results for analysis by a statistical analysis engine 215.

A regional overlay 220 is used by the biometric matching engine 210 to consistently define regions on each sample being matched against its counterpart reference biometric template. Alignment of the biometric samples to match their counterpart reference templates is performed in a way that assures consistency in orientation for determination of the relevant regions for sampling. Depending on the alignment processes employed by the biometric matching engine 210, normalization of the biometric samples and their counterpart reference templates to a uniform orientation is sometimes required.

The statistical analysis engine 215 receives the output from the biometric matching engine 210 and determines the probability of match by region 235. This information is then used to generate 240 regional selection criteria 245. As an alternative, the output from the biometric matching engine 210 is graphically displayed and regional selection criteria 245 determined visually. The regional selection criteria 245 are stored locally, inside of a security token or, alternatively, received from a remote source such as a networked authentication server. The regional selection criteria 245 is used by a biometric processing engine 255 associated with the local client 105 for processing a user's biometric sample 265 received 270 from the biometric scanner 95. The regional selection criteria 245 optionally include alignment information to normalize the received biometric sample to the same orientation as the counterpart biometric reference template.

The output 280 from the biometric processing engine 255 is incorporated into data packets having a hierarchy 275 based on the probability of matching a counterpart reference biometric template. The hierarchy prioritizes the data packet containing the extracted data having the highest probability of matching to be transmitted 285 first to a biometric matching engine.

Figure 10E:
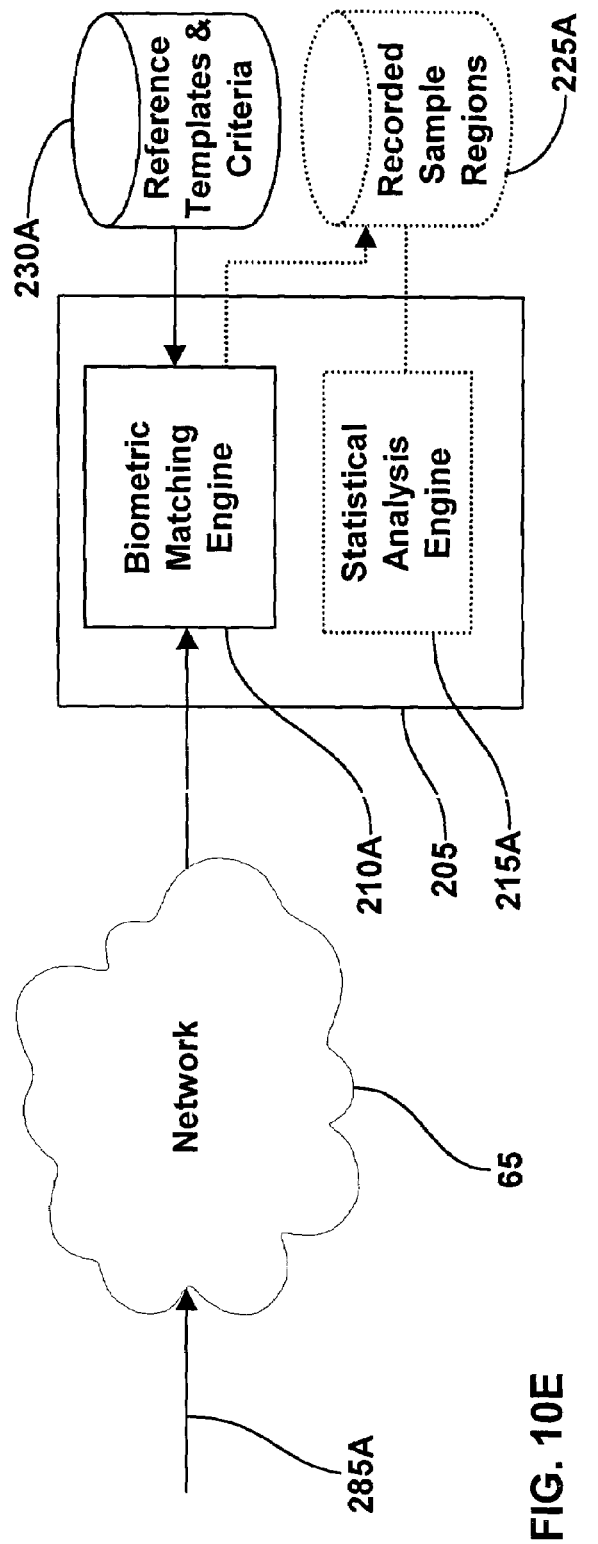
FIG. 10E is a detailed block diagram of another embodiment of the invention where a biometric matching engine is incorporated into a remote computer system connected to a local host by a network.

Referring to FIG. 10E, an embodiment of the invention is shown wherein data packets are transmitted 285A over a network 65 and processed by a biometric matching engine 210A installed in a remote authentication server 205. In this embodiment of the invention the data packets are transmitted in TCP/IP protocol or an equivalent packet switching communications arrangement. The biometric matching engine 210A compares the received biometric sample information and compares it to a database of reference templates 230A for identification and authentication purposes. In this embodiment of the invention, the database of reference templates 230A also includes the regional selection criteria which is received by the local client 105 prior to receiving the biometric sample from the user 265 (not shown.) In a related embodiment of the invention, the incoming biometric sample data including information related to the region in which the data was extracted is recorded in a database 225A along with a matching success rate. The recorded information 225A is used by a statistical analysis engine 215A to heuristically improve matching over time.

Figure 10F:
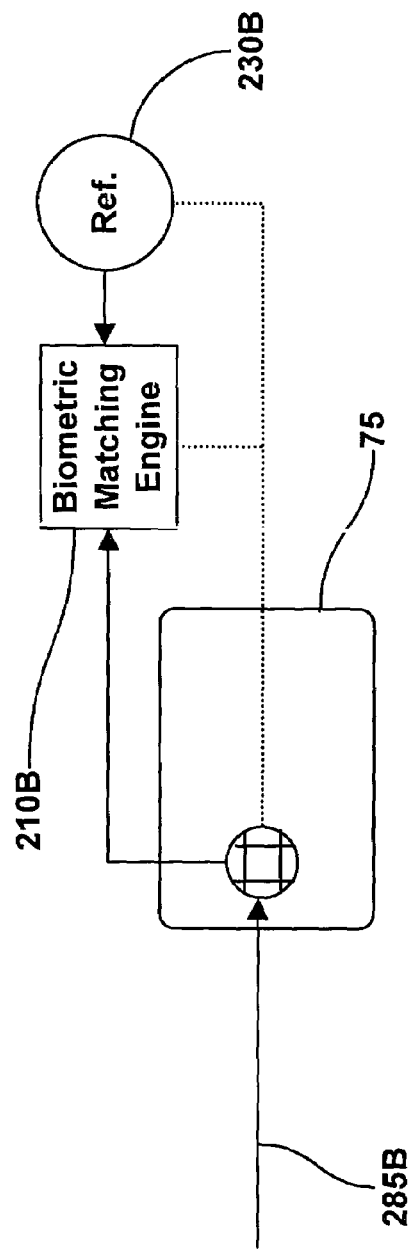
FIG. 10F is a detailed block diagram of another embodiment of the invention where the biometric matching engine is incorporated into a security token.

Referring to FIG. 10F, another embodiment of invention shown wherein data packets are transmitted 285B to a security token 75 having a biometric matching engine 210B and a reference biometric template 230B specific to the token holder operatively installed therein. In this embodiment of the invention, the data packets are transmitted in an APDU protocol. The biometric matching engine 210B compares the received biometric sample information to the reference template 230B for identification and authentication purposes.

Figure 10G:
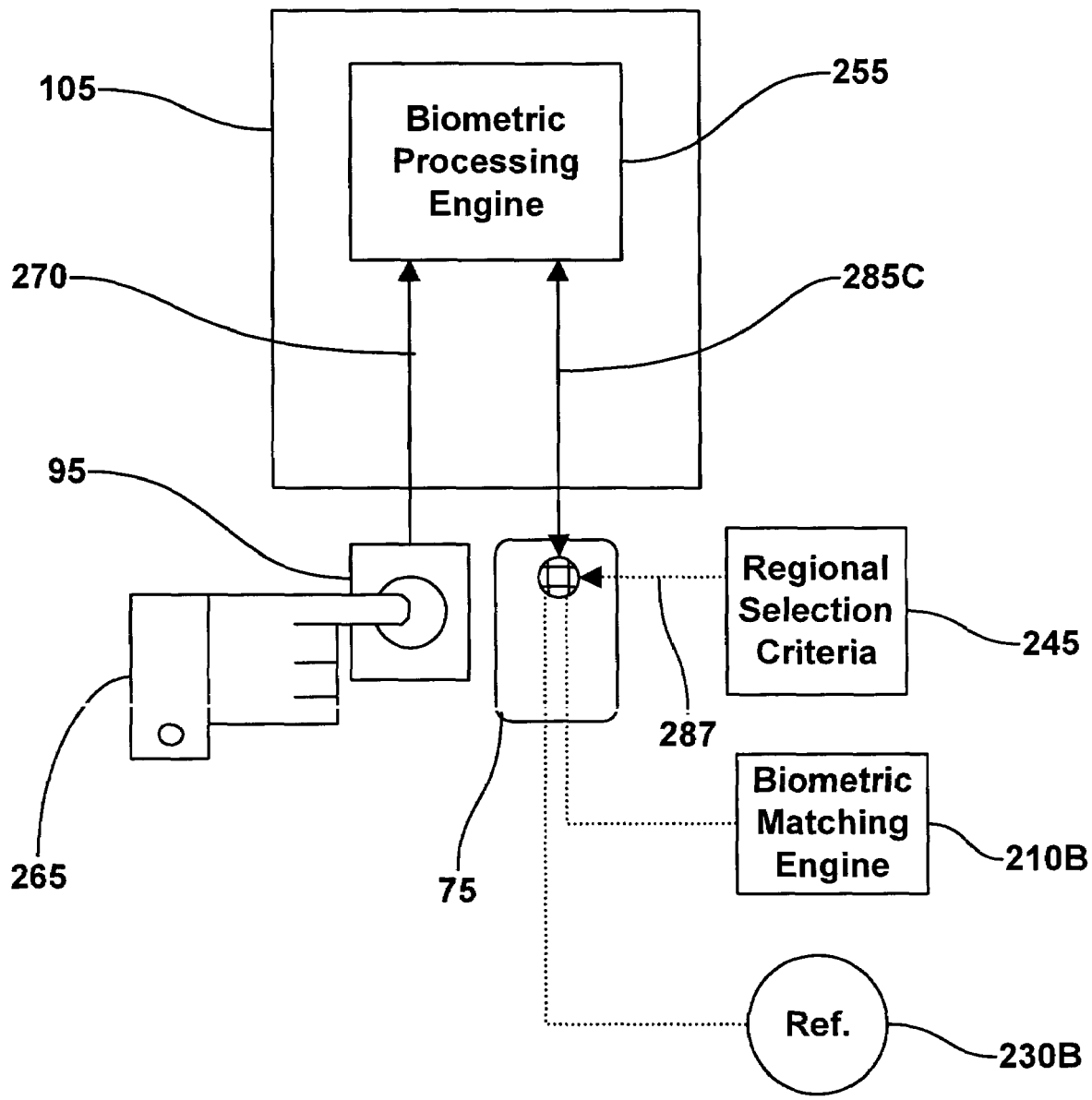
FIG. 10G is a detailed block diagram of another embodiment of the invention where the biometric matching engine and regional selection criteria are incorporated into a security token.

Referring to FIG. 10G, another embodiment of the invention is shown where the regional selection criteria 245 is stored inside this security token 75 and is sent 287 to the biometric processing engine 255 for preprocessing of a user's biometric sample 265 received 270 from the biometric scanner 95. The output 285C from the biometric processing engine 255 is sent to the security token 75 for processing by the biometric matching engine 210B. The biometric matching engine 210B compares the received biometric sample information and to the reference template 230B for identification and authentication purposes.

Figure 10H:
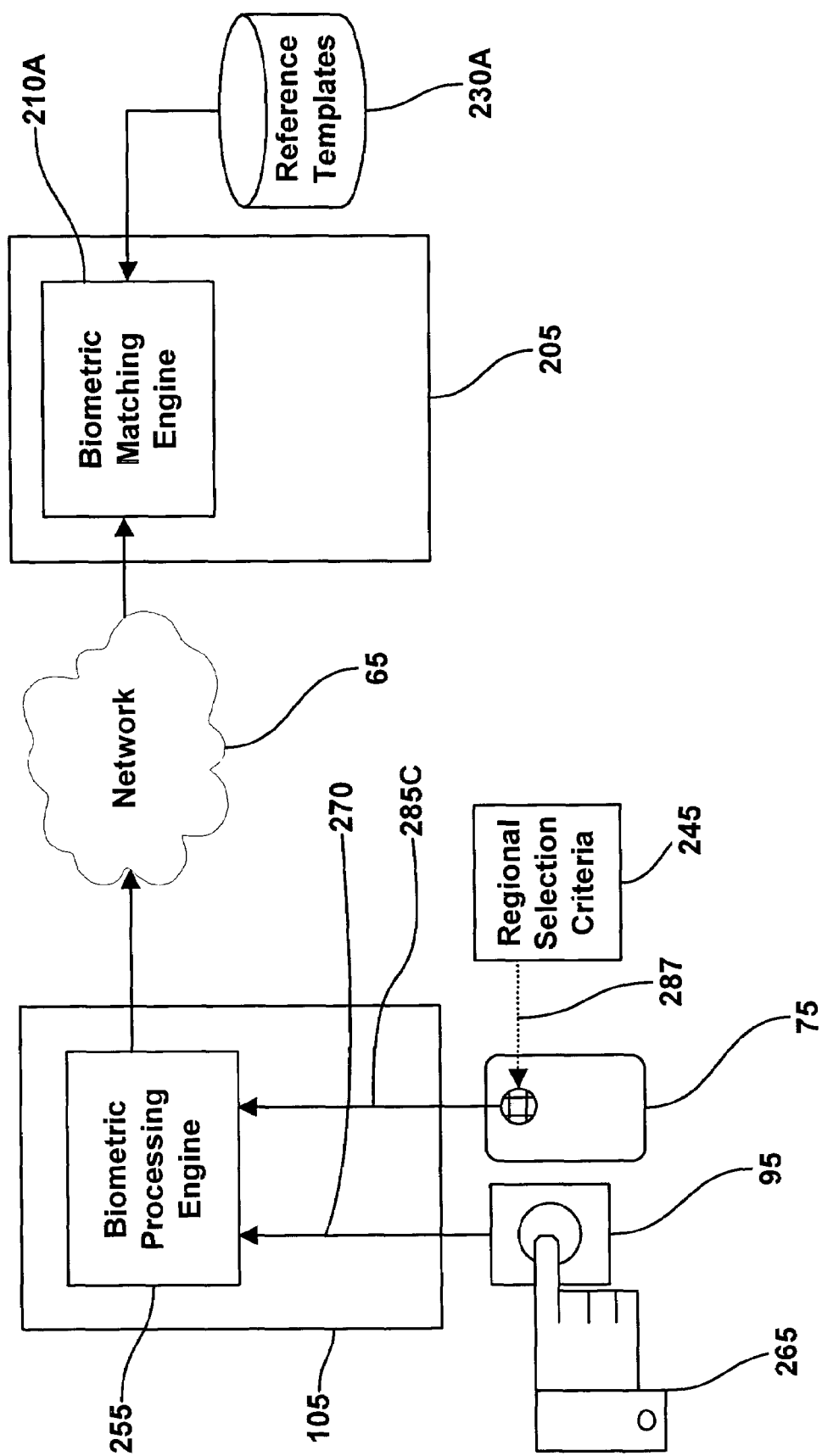
FIG. 10H is a detailed block diagram of another embodiment of the invention where pre-processing of a biometric sample is accomplished locally using information received from a connected security token and subsequent processing performed by a remote biometric matching engine.
Figure 11:
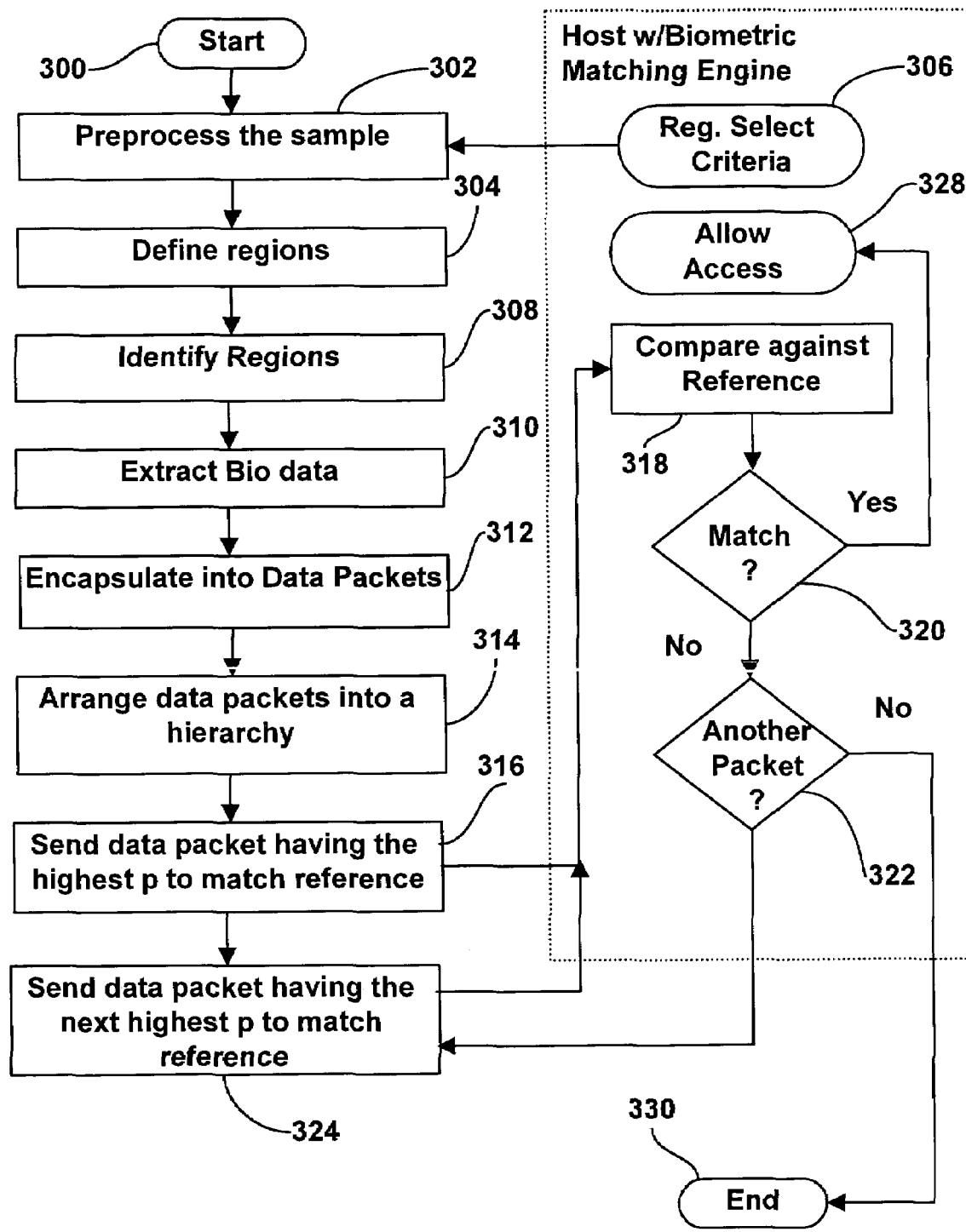
FIG. 11 is a flow diagram illustrating the steps for implementing an exemplary embodiment of the invention.

Referring to FIG. 10H, another embodiment of the invention is shown where the regional selection criteria 245 is stored inside this security token 75 and is transmitted 287 to the biometric processing engine 255 for preprocessing of a user's biometric sample 265 received 270 from the biometric scanner 95. The output 285A from the biometric processing engine 255 is transmitted 285A over the network 65 and processed by the biometric matching engine 210A installed in the remote authentication server 205. As previously described, the biometric matching engine 210A compares the received biometric sample information and to data within a database of reference templates 230A for identification and authentication purposes Referring to FIG. 11, a flowchart is depicted for implementing an embodiment of the invention. The process is initiated 300 by receiving and preprocessing 302 a biometric sample using regional selection criteria received from a host containing a biometric matching engine 306.

The regional selection criteria is then applied to the received biometric sample to define specific sampling regions 304. Regions having the highest probability of matching a reference are identified 308, followed by the extraction of relevant biometric data from the identified regions 310.

The extracted data is then encapsulated into data packets 312 and arranged in a transmission hierarchy allowing for selection of the data packet(s) having the highest probability of matching the reference template 314. The data packet having the highest probability of matching the reference template 316 is transmitted first to the biometric matching engine. Of course, so long as the first data packet transmitted has a sufficient probability of matching the reference template, it is not essential that it have the highest probability of matching the reference template.

The biometric matching engine compares the received data against a reference biometric template 318. If a match is obtained using the first data packet 320, the user is authenticated and access to token resources is allowed 328. If a match is not obtained using the first data packet 320, the biometric matching engine determines whether an additional data packet is needed to match the reference biometric template 322. In this situation, it is possible that the initial data packet received is sufficient to determine that it does not belong to the proper user and ends the authentication transaction 330. Alternately, it is possible that the biometric sample is somehow degraded due to physiological changes associated with the user, environmental conditions impacting the quality of the sampling and/or problems associated with the biometric scanner. In this situation, another data packet is requested 322 from the client.

The client responds by sending the data packet having the next highest priority to the biometric matching engine 324. This process may be repeated until all data packets maintained by the client had been sent to the biometric matching engine or until a match is made between the consolidated sample and the reference template. Processing ends if all data packets maintained by the client have been transmitted to the biometric matching engine without a match 330.

Figures 12A, 12B, 12C:
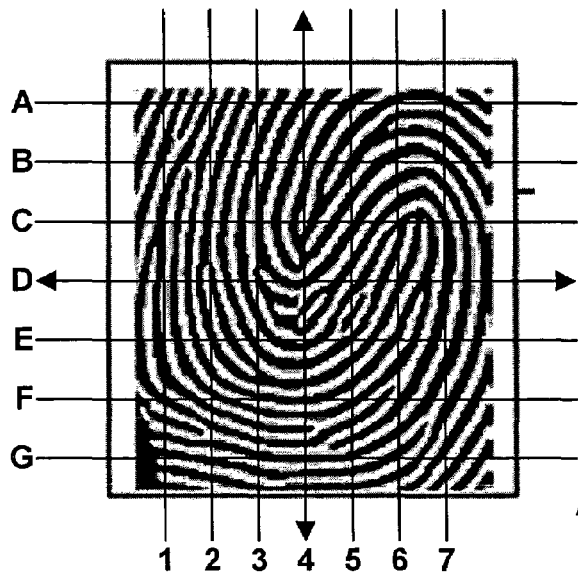
FIG. 12A is a fingerprint image similar to that of FIG. 2A with a GRID overlay.
FIG. 12B is a diagram of the grid of FIG. 12A with sequential numbering from left to right.
FIG. 12C is a diagram of the grid of FIG. 12A with an alternative numbering pattern.

Referring to FIG. 12A, shown is the fingerprint of FIG. 2 with a grid overlay. The grid overlay 1200 allows for determination of ridge flow angles within predetermined areas of the fingerprint. For example, between lines B and C and lines 2 and 3 is a region wherein ridge flow angles are relatively straight and relatively parallel. This allows for determination of ridge flow angles with a reasonable amount of accuracy is preferred for use in ridge flow angle feature registration. The grid overlay 1200 is spaced and sized relative to the fingerprint biometric sample to be repeatably overlaid in a consistent fashion. So long as the grid is aligned similarly to the fingerprint image during template generation—enrollment—and during feature extraction for registration, the resulting ridge flow angles should match.

Referring to FIG. 12b, the grid is shown with box numbering from 1 to n across the rows and down the columns. The use of the numbering allows for identification of expected ridge flow angles based only on grid number. As such, the previously identified box is box number 19. Thus instead of storing a grid box identifier, it is possible to sort all ridge flow angles in order of box number such that the ridge flow angle of box 19 is stored as the 19th ridge flow angle in the feature data.

Referring to FIG. 12C there is shown a single box of the grid with a vector representing the ridge flow angle within the box. As is evident from the figure, there is a size for a box that is near optimal wherein the ridges are sufficiently long to make angle determination straightforward and are sufficiently small that the ridge flow within each box is fairly approximated by a straight line as is the case within grid box 19. Other boxes, such as grid boxes 1 and 36 are less amenable to accurate ridge flow angle determination. As such, it is evident that some ridge flow angle determinations form better features than others since they represent the ridge flow more accurately.

Thus, the grid shown in FIG. 12C is replaceable with a set of indices indicating each grid box and an angle of the ridge flow within said grid box. Of course, if all ridge flow angles are stored, one for each grid box, then a need to store the indices is obviated.

Of course, ordering of the grid boxes in order of better ridge flow angles to worse ridge flow angles reduces the overall number of feature comparisons necessary in accordance with the methods shown in flow diagrams of FIGS. 4-7.

Figure 13:
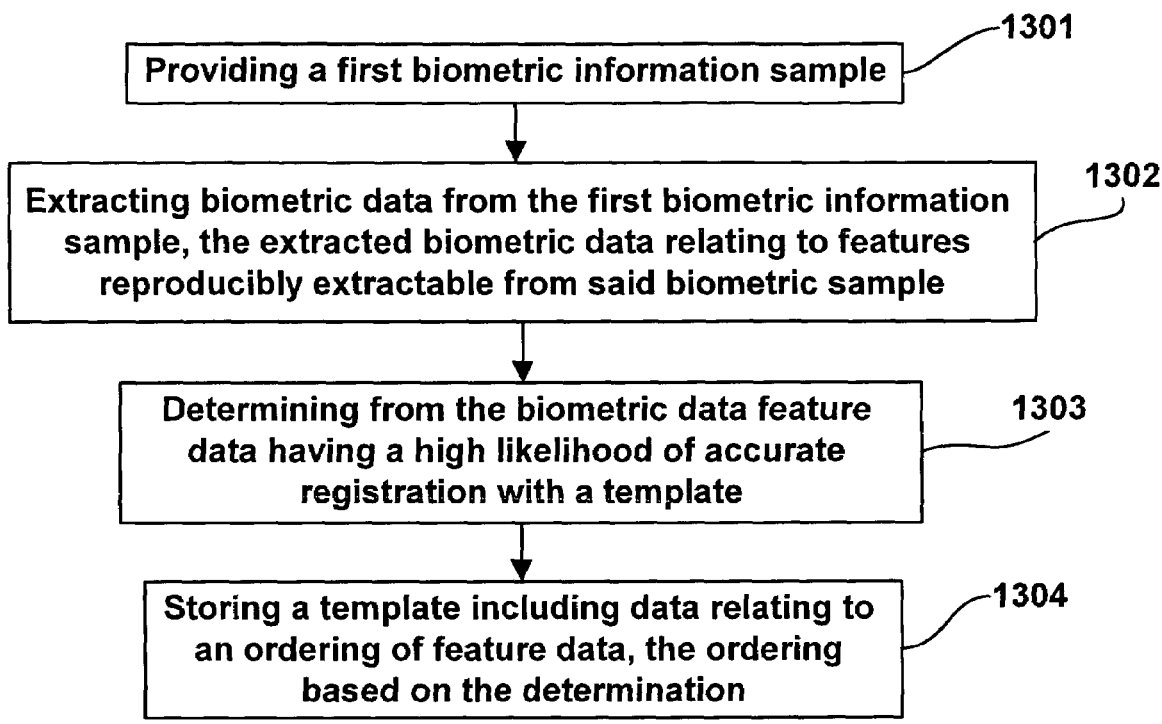
FIG. 13 is a simplified flow diagram of a method of template formation.

Referring to FIG. 13, a simplified flow diagram of a method of template formation according to the invention is shown. A first biometric information sample is provided at step 1301. The first biometric information sample is sensed to result in sensed data. The sensed data is preprocessed to filter same in order to provide data of a quality suitable for use in template generation. The sensed data is analysed to extract therefrom biometric data at step 1302. The biometric data relates to features reproducibly extractable from the sensed data.

Features having a high likelihood of accurate registration with a template are then identified within the biometric data at step 1303. These features are generally features having a higher quality factor or a greater uniqueness. Typically, features that are known to result form noise or dirt are not identified in this step. The result of step 1303 is an identification of those features most likely to be useful in biometric registration against a template. In step 1304, a template is stored including data relating to an ordering of the biometric data relating to features, the ordering based on the identification. For example, the biometric data are ordered based on a quality thereof. As such, during the registration process, higher quality features are provided first for registration. Alternatively, the biometric data is stored ordered according to a range of quality into which each datum is grouped. Thus, higher quality features are provided first though, not necessarily in order of their individual quality.

Figure 14:
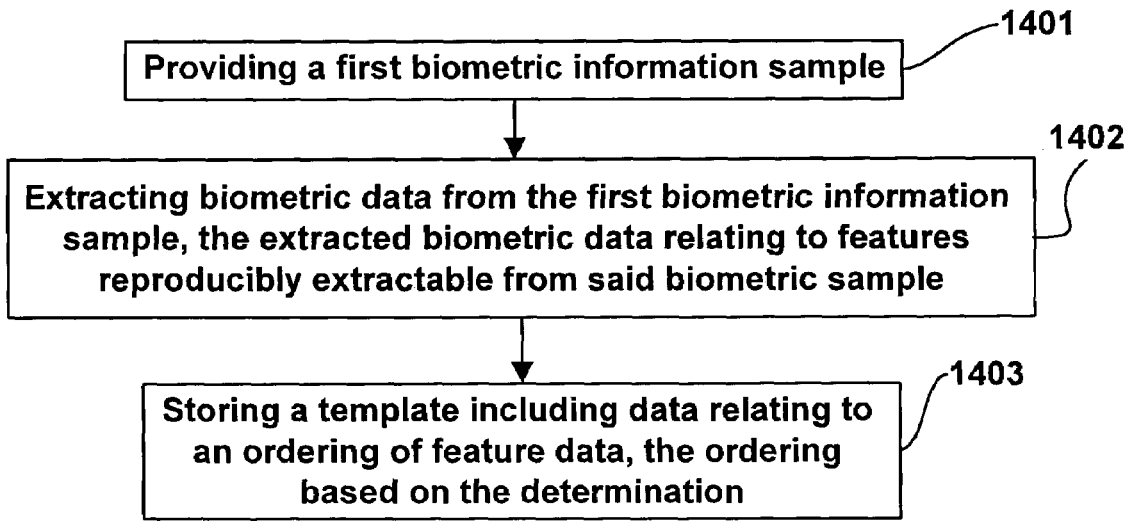
FIG. 14 is a simplified flow diagram of a method of template formation.

Referring to FIG. 14, a simplified flow diagram of a method of template formation according to the invention is shown. A first biometric information sample is provided at step 1401. The first biometric information sample is sensed to result in sensed data. The sensed data is preprocessed to filter same in order to provide data of a quality suitable for use in template generation. The sensed data is analysed to extract therefrom biometric data at step 1402. The biometric data relates to features reproducibly extractable from the sensed data.

Features statistically likely to have a high likelihood of accurate registration with a template are then identified within the biometric data at step 1403 based on a priori knowledge of locations of features statistically likely to have higher quality. These features are generally located where the sensor is most likely to sense them effectively. Typically, features that are known to reside in locations or regions having higher noise are not identified in this step. The result of step 1403 is an identification of those features most likely to be useful in biometric registration against a template. In step 1403, a template is stored including data relating to an ordering of the biometric data relating to features, the ordering based on the identification. For example, the biometric data are ordered based on a quality thereof. As such, during the registration process, higher quality features are provided first for registration. Alternatively, the biometric data is stored ordered according to a range of quality into which each datum is grouped. Thus, higher quality features are provided first though, not necessarily in order of their individual quality.

Similarly, it is within the scope of the invention to reorder other features extracted from a biometric sample such as minutia angles in accordance with a likelihood that those features will contribute most significantly to the accumulated value.

Though the above description relies upon selection criteria provided for determining feature order, in an alternative embodiment feature order is predetermined or determined dynamically based on some other criteria and without being provided. Though the fullest benefits of feature ordering for reducing data processing needed to successfully register a biometric sample against a template is not as sure, statistically, even predetermined ordering results in substantial benefits.

Though the above description relates specifically to fingerprint analysis, it is also applicable to other biometric samples such as iris scans, retinal scans, palm prints, toe prints, voice prints and so forth.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the Claims following herein.

What is claimed is:

1. A method of biometric authentication from a biometric sample received by a local client, the method comprising:
    defining a plurality of regions within the biometric sample;
    identifying which of the plurality of regions includes biometric feature data having at least a predetermined probability of matching a pre-established reference;
    extracting the biometric feature data from the identified regions;
    incorporating the extracted biometric feature data into a plurality of data packets;
    arranging the plurality of data packets in a hierarchy from highest probability to lowest probability based, at least in part, on the probability of matching the pre-established reference;
    transmitting a data packet of the plurality of data packets having a highest known probability of the plurality of data packets of matching the pre-established reference to a biometric matching engine; and
    iteratively transmitting another data packet of the plurality of data packets having a highest known probability of the remaining data packets of matching the pre-established reference, if previously transmitted data packets did not result in a match at the biometric matching engine.

2. The method of claim 1, wherein the known probability is a probability sufficient for successfully completing the biometric authentication.

3. The method of claim 1, wherein each of the data packets includes data relating to one of the regions of the biometric sample.

4. The method of claim 1, wherein each of data packets includes a single datum relating to one of the regions of the biometric sample.

5. The method of claim 1, further comprising determining selection criteria for the biometric feature data from output of the biometric matching engine.

6. The method of claim 5, wherein the selection criteria is a regional selection criteria.

7. The method of claim 1, wherein the biometric matching engine comprises a server based application.

8. The method of claim 1, wherein the biometric matching engine comprises a security token based application.

9. The method of claim 1, wherein the biometric matching engine comprises both a server based application and a security token based application.

10. The method of claim 1, wherein identifying which regions include biometric feature data is performed postliminary of defining a plurality of regions within the biometric sample.

11. The method of claim 1, wherein identifying which regions include biometric feature data is performed heuristically.

12. The method of claim 1, wherein identifying which regions include biometric feature data is performed both postliminary of defining a plurality of regions within the biometric sample and heuristically.

13. A system for biometric data extraction and transmission of extracted biometric data from a biometric sample received by a local client, the system comprising:
    means for providing a biometric sample; and
    means for processing the biometric sample, wherein the means for processing includes at least one biometric processing application programmed to perform a method comprising defining a plurality of regions within the biometric sample;
    identifying which of the plurality of regions includes biometric feature data having at least a predetermined probability of matching a pre-established reference;
    extracting the biometric feature data from the identified regions;
    incorporating the extracted biometric feature data into a plurality of data packets;
    arranging the plurality of data packets in a hierarchy from highest probability to lowest probability based, at least in part, on the probability of matching the pre-established reference;
    transmitting a data packet of the plurality of data packets having a highest known probability of the plurality of data packets of matching the pre-established reference to a biometric matching engine; and iteratively transmitting another data packet of the plurality of data packets having a highest known probability of the remaining data packets of matching the pre-established reference, if previously transmitted data packets did not result in a match at the biometric matching engine.

14. The system of claim 13, wherein the biometric processing application further includes means for preprocessing the biometric sample.

15. The system of claim 14, wherein the preprocessing means includes means for aligning the biometric sample according to alignment information supplied at least in part by the biometric matching engine.

16. The system of claim 13, wherein the biometric matching engine is installed in a server.

17. The system of claim 13, wherein the biometric matching engine is installed in a security token.

18. The system of claim 13, wherein the biometric matching engine is installed in both a server and a security token.

19. The system of claim 13, wherein the biometric processing application includes means for identifying the plurality of regions prospectively by preprocessing the received biometric sample.

20. The system of claim 13, wherein the biometric processing application includes means for identifying the plurality of regions retrospectively by processing the biometric data from the identified regions.

21. The system of claim 13, wherein the biometric processing application includes means for processing the biometric data to identify the plurality of regions both prospectively and retrospectively.

22. A computer readable medium having executable instructions stored therein that when executed by a computer enable the computer to perform a method comprising:
defining a plurality of regions within a biometric sample;
identifying which of the plurality of regions includes biometric feature data having at least a predetermined probability of matching a pre-established reference;
extracting the biometric feature data from the identified regions;
incorporating the extracted biometric feature data into a plurality of data packets;
arranging the plurality of data packets in a hierarchy from highest probability to lowest probability based, at least in part, on the probability of matching the pre-established reference;
transmitting a data packet of the plurality of data packets having a highest known probability of the plurality of data packets of matching the pre-established reference to a biometric matching engine; and
iteratively transmitting another data packet of the plurality of data packets having a highest known probability of the remaining data packets of matching the pre-established reference, if previously transmitted data packets did not result in a match at the biometric matching engine.

23. A method of biometric authentication, the method comprising:
extracting biometric feature data from a biometric sample, the extracted biometric feature data relating to features reproducibly extractable from said biometric sample;
grouping the extracted biometric feature data into a plurality of packets, the individual packets including a portion of the extracted biometric feature data from a different region of the biometric sample sufficient for identification of the biometric sample with a biometric matching engine, wherein the packets are ordered in a transmission order based, at least in part, on a likelihood of sufficient identification of the biometric sample;
transmitting a first packet to the biometric matching engine based on the transmission order; and
transmitting a second packet to the biometric matching engine based on the transmission order, wherein the second packet is only sent if the first packet did not result in a match at the biometric matching engine.

24. The method of claim 23, wherein the biometric feature data are organized in each packet in an order based on a likelihood of the respective feature contributing to a match by the biometric matching engine.

25. The method of claim 23, further comprising authenticating a user supplying the biometric sample based on at least one biometric datum of the first packet.

26. The method of claim 23 wherein the portion of extracted biometric feature data in each packet is likely sufficient for identification by the biometric matching engine within predetermined limits.

27. The method of claim 23 wherein the first packet includes a single biometric datum.

28. The method of claim 23 wherein the first packet includes a plurality of biometric feature data.

29. A system for biometric authentication, the system comprising:
a sensor for obtaining a biometric sample; and
a processor for extracting biometric feature data from the biometric sample, wherein the extracted biometric feature data relates to features reproducibly extractable from said biometric sample, wherein the processor is configured to
group the extracted biometric feature data into a plurality of packets, wherein the individual packets include a portion of the extracted biometric feature data sufficient for identification of the biometric sample by a biometric matching engine within predetermined limits, wherein the packets are ordered in a transmission order based, at least in part, on a likelihood of sufficient identification of the biometric sample;
transmit a first packet to the biometric matching engine based on the transmission order; and
transmit a second packet to the biometric matching engine based on the transmission order, wherein the second packet is only sent if the first packet did not result in a match at the biometric matching engine.

30. The system of claim 29, wherein the biometric feature data are organized in each packet in an order based on a likelihood of the respective feature contributing to a match by the biometric matching engine.

31. The system of claim 29, further comprising:
a security token interface port for interfacing with a security token carrying the biometric matching engine; and
a transceiver for transmitting the packets to the biometric matching.

32. The system of claim 29, wherein the processor is a first processor, the system further comprising:
a network interface port for interfacing with a network; and
a transceiver for transmitting the packets to the biometric matching engine operably coupled to a second processor in communication with the network via the network interface port.

33. A computer readable medium having executable instructions stored therein that when executed by a computer enable the computer to perform a method comprising:
extracting biometric feature data from a biometric sample, the extracted biometric feature data relating to features reproducibly extractable from said biometric sample;

grouping the extracted biometric feature data into a plurality of packets, the individual packets including a portion of the extracted biometric feature data from a different region of the biometric sample sufficient for identification of the biometric sample with a biometric matching engine, wherein the packets are ordered in a transmission order based, at least in part, on a likelihood of sufficient identification of the biometric sample;

transmitting a first packet to the biometric matching engine based on the transmission order; and transmitting a second packet to the biometric matching engine based on the transmission order, wherein the second packet is only sent if the first packet did not result in a match at the biometric matching engine.

34. The computer readable medium of claim 33 wherein the computer readable medium is housed within a workstation in communication with a computer network, wherein the computer network includes an authentication server.

35. The computer readable medium of claim 33 wherein the computer readable medium is housed within a workstation comprising a port for communication with a security token including an authentication server.

* * * * *